United States Patent
Miyamoto et al.

(10) Patent No.: US 8,274,875 B2
(45) Date of Patent: Sep. 25, 2012

(54) OPTICAL DISC DEVICE AND FOCUS CONTROL METHOD

(75) Inventors: Hirotaka Miyamoto, Kanagawa (JP); Kimihiro Saito, Saitama (JP); Kunihiko Hayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/452,672

(22) PCT Filed: May 25, 2009

(86) PCT No.: PCT/JP2009/059927
§ 371 (c)(1),
(2), (4) Date: Feb. 8, 2010

(87) PCT Pub. No.: WO2009/145330
PCT Pub. Date: Dec. 3, 2009

(65) Prior Publication Data
US 2010/0195453 A1  Aug. 5, 2010

(30) Foreign Application Priority Data
May 26, 2008  (JP) .............................. P2008-137025

(51) Int. Cl.
*G11B 7/00* (2006.01)

(52) U.S. Cl. .................. 369/103; 369/44.11; 369/44.37; 369/53.28

(58) Field of Classification Search ............... 369/44.11, 369/44.37, 53.28, 53.23, 94, 103; 359/1
See application file for complete search history.

(56) References Cited

U.S. PATENT DOCUMENTS

| | | | |
|---|---|---|---|
| 4,748,610 A | 5/1988 | Nakata et al. |
| 5,933,397 A | 8/1999 | Yamashita et al. |
| 6,101,157 A | 8/2000 | Bradshaw et al. |
| 6,963,520 B1 | 11/2005 | Park et al. |
| 7,193,953 B2 | 3/2007 | Kim |
| 7,706,233 B2 | 4/2010 | Horimai et al. |
| 7,916,585 B2 | 3/2011 | Saito |

(Continued)

FOREIGN PATENT DOCUMENTS

JP   58-041447 A   3/1983

(Continued)

OTHER PUBLICATIONS

Toriumi et al., "Reflection confocal microscope readout system for three-dimensional photochromic optical data storage", Optics Letters, vol. 23, Issue 24, pp. 1924-1926 (1998).

*Primary Examiner* — Thomas Alunkal
(74) *Attorney, Agent, or Firm* — Wolf, Greenfield & Sacks, P.C.

(57) ABSTRACT

Disclosed is an optical disc device that is able to increase accuracy in reproducing information from an optical disc. The optical disc device 10 calculates a focus error signal SFE2 and a sum signal SS1 while reciprocating an objective lens 21 in a focus direction until a distance between a focal point FS and a focal point FM1 becomes close to the depth d of a target position PG at the time of a pull-in operation, and when a trigger signal ST1 generated on the basis of the sum signal SS1 is at low level, starts focus control on the basis of the focus error signal SFE2. Therefore, focus control can start in a state where the focus error signal SFE2 curves in an S shape with sufficient amplitude.

14 Claims, 20 Drawing Sheets

U.S. PATENT DOCUMENTS

| | | |
|---|---|---|
| 7,929,402 B2 | 4/2011 | Miyamoto et al. |
| 7,933,188 B2 | 4/2011 | Kimura et al. |
| 7,936,656 B2 | 5/2011 | Miyamoto et al. |
| 8,000,189 B2 | 8/2011 | Nakao et al. |
| 8,040,764 B2 | 10/2011 | Miyamoto et al. |
| 8,077,582 B2 | 12/2011 | Saito et al. |
| 8,107,331 B2 | 1/2012 | Miyamoto et al. |
| 2002/0101800 A1* | 8/2002 | Kubota ............... 369/44.27 |
| 2002/0191501 A1 | 12/2002 | Ueno |
| 2003/0174595 A1 | 9/2003 | Wilkinson et al. |
| 2004/0001400 A1* | 1/2004 | Amble et al. ........ 369/44.26 |
| 2004/0037197 A1* | 2/2004 | Fujiune et al. ...... 369/53.22 |
| 2004/0212859 A1* | 10/2004 | Tsukagoshi ............ 359/15 |
| 2005/0105445 A1* | 5/2005 | Kim ................... 369/103 |
| 2005/0195707 A1 | 9/2005 | Park et al. |
| 2006/0050544 A1* | 3/2006 | Horimai .................. 365/6 |
| 2006/0092778 A1 | 5/2006 | Shibuya et al. |
| 2006/0114794 A1 | 6/2006 | Suzuki et al. |
| 2006/0246375 A1 | 11/2006 | Shiono et al. |
| 2006/0291360 A1* | 12/2006 | Maeda et al. ........ 369/53.23 |
| 2007/0047419 A1* | 3/2007 | Usami ................. 369/103 |
| 2008/0037083 A1* | 2/2008 | Ogasawara .............. 359/3 |
| 2008/0089209 A1 | 4/2008 | Miyamoto et al. |
| 2008/0192611 A1* | 8/2008 | Yamasaki et al. ..... 369/112.05 |
| 2008/0239921 A1* | 10/2008 | Tatsuta et al. .......... 369/103 |
| 2008/0239924 A1 | 10/2008 | Fujita et al. |
| 2008/0316902 A1 | 12/2008 | Saito et al. |
| 2009/0147652 A1 | 6/2009 | Fujita |
| 2009/0168632 A1 | 7/2009 | Miyamoto et al. |
| 2009/0262633 A1 | 10/2009 | Saito et al. |
| 2009/0285059 A1 | 11/2009 | Fujita et al. |
| 2010/0027403 A1 | 2/2010 | Fujita et al. |
| 2010/0046345 A1 | 2/2010 | Fujita et al. |
| 2010/0165825 A1 | 7/2010 | Saito et al. |
| 2011/0044152 A1 | 2/2011 | Nemoto et al. |
| 2011/0134732 A1 | 6/2011 | Miyamoto et al. |

FOREIGN PATENT DOCUMENTS

| | | |
|---|---|---|
| JP | 60-170035 A | 9/1985 |
| JP | 60-258739 A | 12/1985 |
| JP | 61-248231 A | 11/1986 |
| JP | 62-020147 | 1/1987 |
| JP | 62-167628 A | 7/1987 |
| JP | 62-136482 U | 3/1989 |
| JP | 64-042514 U | 3/1989 |
| JP | 03-248342 A | 11/1991 |
| JP | 04-321934 A | 11/1992 |
| JP | 07-021565 A | 1/1995 |
| JP | 10-064104 A | 3/1998 |
| JP | 10-308033 A | 11/1998 |
| JP | 11-296875 A | 10/1999 |
| JP | 11-328724 A | 11/1999 |
| JP | 2000-163795 A | 6/2000 |
| JP | 2000-348354 A | 12/2000 |
| JP | 2001-067714 A | 3/2001 |
| JP | 2001-325748 A | 11/2001 |
| JP | 2001-357542 A | 12/2001 |
| JP | 2002-334433 A | 11/2002 |
| JP | 2003-077157 A | 3/2003 |
| JP | 2003-132586 A | 5/2003 |
| JP | 2003-217142 A | 7/2003 |
| JP | 2003-272182 A | 9/2003 |
| JP | 2003-315988 A | 11/2003 |
| JP | 2005-037658 A | 2/2005 |
| JP | 2005-235282 A | 9/2005 |
| JP | 2006-114168 A | 4/2006 |
| JP | 2007-042149 A | 2/2007 |
| JP | 2007-179676 A | 7/2007 |
| JP | 2007-220206 A | 8/2007 |
| JP | 2007-287245 A | 11/2007 |
| JP | 2008-017433 A | 1/2008 |
| JP | 2008-071433 A | 3/2008 |
| WO | WO 2006/111972 A2 | 10/2006 |

* cited by examiner

OPTICAL DISC DEVICE AND FOCUS CONTROL METHOD

TECHNICAL FIELD

The present invention relates to an optical disc device and a focus control method, and is preferably applied to, for example, an optical disc device that reproduces information from an optical disc separately having a reference layer for determining an emission position of an optical beam and a recording layer, on which information is recorded.

BACKGROUND ART

There are optical disc devices that reproduce information by emitting an optical beam toward an optical disc, such as CD (Compact Disc), DVD (Digital Versatile Disc), or Blu-ray Disc (Registered Trademark: hereinafter, referred to as BD), and detecting a reflected beam. Such optical disc devices have come into wide use.

In such an optical disc device, an optical beam is emitted to the optical disc so as to change reflectance of the optical disc locally or the like, thereby recording information.

With regard to the optical disc, the size of a beam spot formed when the optical beam is condensed by an objective lens or the like is approximately determined based on λ/NA (λ: the wavelength of the optical beam, NA: numerical aperture). The resolution is proportional to that value. For example, a BD-type optical disc of 120 mm in diameter can record about 25 GB of data per layer.

Meanwhile, the optical disc is designed to record various kinds of information, such as various kinds of content including music or video content, various kinds of data for a computer, and the like. In recent years, the amount of information has been growing due to high-definition video data or high-quality music data, and the number of pieces of content to be recorded on one optical disc has been increasing. For this reason, the optical disc is required to have larger capacity.

To simplify the structure and increase the capacity of the optical disc, some optical disc devices make use of holograms so as to perform standing-wave recording on a flat recording layer of an optical disc in a multilayer structure (for example, see Patent Citation 1).

Patent Citation 1: JP-A-2007-220206 (FIG. 24)

With regard to the optical discs that correspond to the optical disc device configured as above, since the recording layer is flat, the optical disc is also provided with a reference layer on which tracks or the like are formed for positioning. The reference layer allows the optical disc device to specify recording positions inside the recording layer.

For example, as shown in FIG. 1, inside a recording layer 101 of an optical disc 100, there are a plurality of layers (hereinafter, referred to as mark layers Y) having recording marks spirally arranged on a predetermined plane. In the optical disc 100, a predetermined distance DG refers to a distance between a target track TG of the reference layer 102 and a target mark layer YG of the recording layer 101 in terms of a direction along a normal line XD of the reference layer 102.

When reproducing information, the optical disc device 1 lets a predetermined reference optical beam LS pass through a beam splitter 3. An objective lens 4 focuses the beam on the reference layer 102 of the optical disc 100.

The optical disc device 1 detects a reflected reference optical beam after the reference optical beam LS is reflected by the reference layer 102 of the optical disc 100, and performs focus control and tracking control of the objective lens 4 in accordance with the detection result, thereby focusing the reference optical beam LS on the target track TG of the reference layer 102.

The optical disc device 1 lets the beam splitter 3 reflect an information optical beam LM. The objective lens 4 whose position is under control focuses the beam on the target mark layer YG from among mark layers Y formed inside the recording layer 101.

In this case, on the assumption that an optical axis XL of the reference optical beam LS and the information optical beam LM is aligned with the normal line XD of the optical disc 100, the optical disc device 1 makes sure that the distance between a focal point FS of the reference optical beam LS and a focal point FM of the information optical beam LM is DG on the optical axis XL. As a result, the focal point Fb of the information optical beam LM can be focused on the target mark layer YG.

Incidentally, after the information optical beam LM is reflected by each recording mark of the target mark layer YG, the optical disc device 1 detects a reflected information optical beam, thereby reproducing recorded information.

However, there is a possibility that the optical disc 100 inclines with respect to the optical disc device 1 due to the deformation of the optical disc 100, so-called surface wobbling, or the like.

For example, as shown in FIG. 2, which shows the same thing as FIG. 1, if the optical disc 100 tilts at θ degrees, the distance between the reference layer 102 and the target mark layer YG on the optical axis XL becomes (1/cos θ) times longer than the distance DG, so the distance differs from the distance DG.

In this case, even if the reference optical beam LS is focused on the reference layer 102 of the optical disc 100, the focal point FM of the information optical beam LM may not be on the target mark layer YG. Accordingly, information may not be read from the target mark layer YG.

That is, if the reference optical beam LS is merely focused on the reference layer 102, this leads to the failure of focus control: the optical disc device 1 may not be able to put the focal point FM of the information optical beam LM on the target mark layer YG. This may result in a significant decrease in accuracy of information reproduction.

The invention has been finalized in consideration of the above points and is intended to suggest an optical disc device and a focus control method that can improve accuracy in reproducing information from an optical disc.

In order to solve such problems, there is provided a focus control method according to the invention. The focus control method includes the steps of emitting a reference optical beam so as to irradiate a reference layer provided in an optical disc, emitting an information optical beam so as to reproduce information from a mark layer on which recording marks representing the information are arranged inside a recording layer provided in the optical disc at a predetermined distance from the reference layer, shaping the information optical beam entering an objective lens such that, in terms of a direction of an optical axis of the information optical beam, a distance between the focal points of the reference optical beam and the information optical beam focused by the objective lens becomes equal to a predetermined distance, moving the objective lens in the direction of the optical disc of the information optical beam, receiving a reflected reference optical beam which is the reference optical beam reflected by the reference layer of the optical disc and generating a reference detection signal, receiving a reflected information optical beam which is the information optical beam reflected by the mark layer of the optical disc and generating an information detection signal, generating a reflected reference beam intensity signal representing the intensity of the reflected reference optical beam on the basis of the reference detection signal and generating a focus error signal, which varies depending on a distance from the mark layer to the focal point of the detected optical beam in the proximity of the mark layer, on the basis of a plurality of information detection signals, and, with change in the reflected reference beam intensity signal as a momentum, starting focus control based on the focus error signal.

DISCLOSURE OF INVENTION

According to the invention, even if the intensity of the reflected information beam is insufficient, focus control appropriately starts on the basis of the intensity of the reflected reference beam, thereby focusing the focal point of the information optical beam on the recording mark layer.

Also, according to the invention, an optical beam is emitted from a predetermined beam source to an optical disc on which a recording mark layer having recording marks representing information arranged planarly is formed inside a recording layer, the objective lens is moved, within a proximity range in which the focal point of the optical beam focused by a predetermined objective lens is located in the proximity of the recording mark layer, in a direction of an optical axis of the optical beam, a reflected optical beam which is the optical beam focused by the objective lens and reflected by the recording marks is received, a beam reception signal is generated, a focus error signal, which varies depending on a distance from the mark layer to the focal point of the optical beam in the proximity of the mark layer, is generated on the basis of the beam reception signal, and focus control based on the focus error signal within the proximity range is started.

Accordingly, in the invention, the focus control can start within the proximity range in which the focal point of the optical beam is located in the proximity of the recording mark layer. As a result, it is possible to significantly reduce a possibility that the focal point of the optical beam is erroneously focused on a different layer or the like.

According to the invention, even if the intensity of the reflected information beam is insufficient, focus control can appropriately start on the basis of the intensity of the reflected reference beam, thereby focusing the focal point of the information optical beam on the recording mark layer. As a result, it is possible to realize an optical disc device and a focus control method that can increase accuracy in reproducing information from the optical disc.

According to the invention, focus control can start within the proximity range in which the focal point of the optical beam is located in the proximity of the recording mark layer, so it is possible to significantly reduce a possibility that the focal point of the optical beam is erroneously focused on a different layer or the like. As a result, it is possible to realize an optical disc device and a focus control method that can increase accuracy in reproducing information from the optical disc.

BEST MODE FOR CARRYING OUT THE INVENTION

An embodiment of the invention will be described in detail with reference to the drawings.

(1) First Embodiment (1-1) Basic Concept for Recording and Reproducing information with respect to Optical Disc The following describes the basic concept for recording and reproducing information according to a first embodiment. In the first embodiment, holograms are recorded on a recording layer 101 of an optical disc 100 as recording marks RM.

Figure 1:
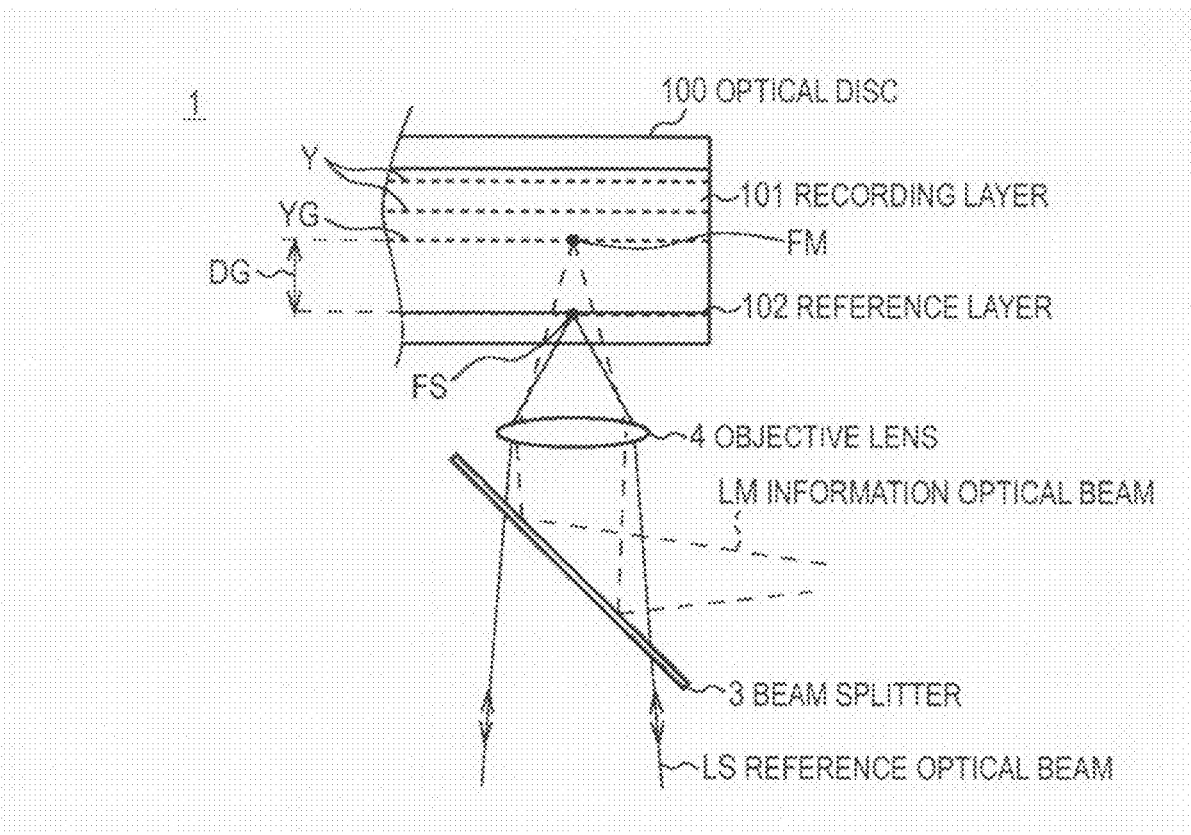
FIG. 1 is a schematic view illustrating the irradiation of a plurality of optical beams to an optical disc.
Figure 2:
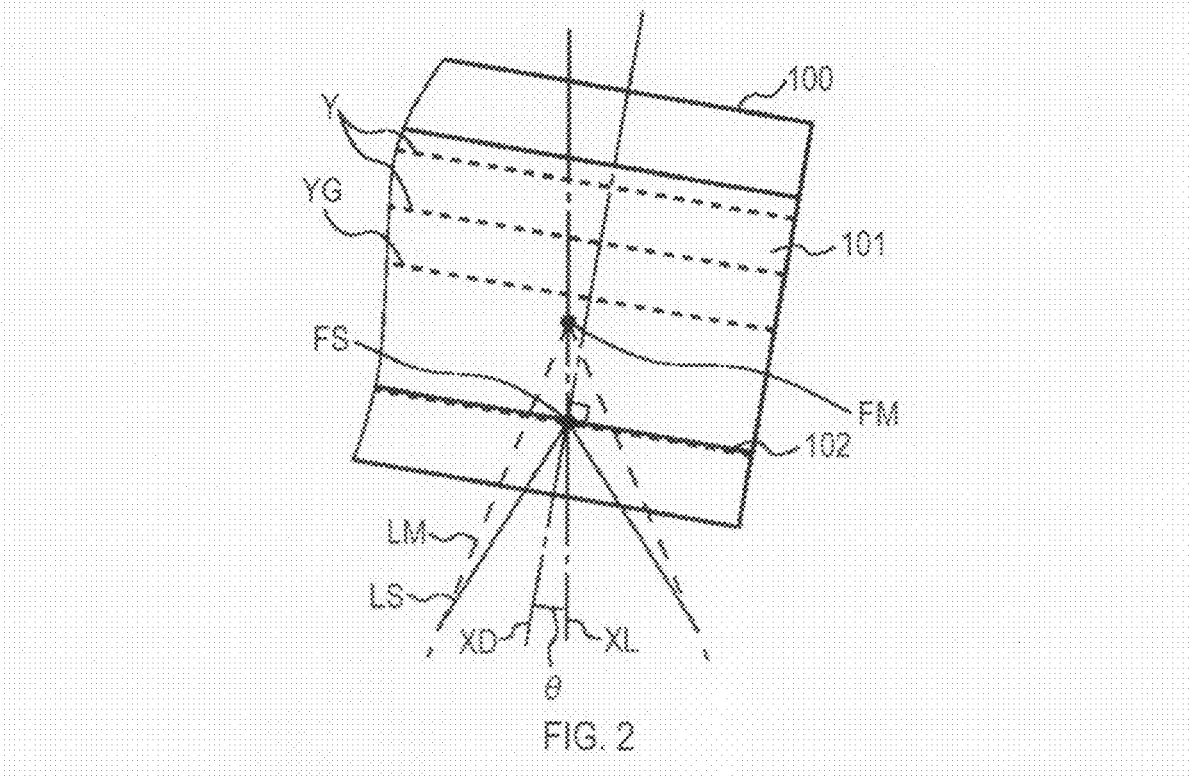
FIG. 2 is a schematic view illustrating the deviation of focal points caused by the tilting of an optical disc.
Figure 3:
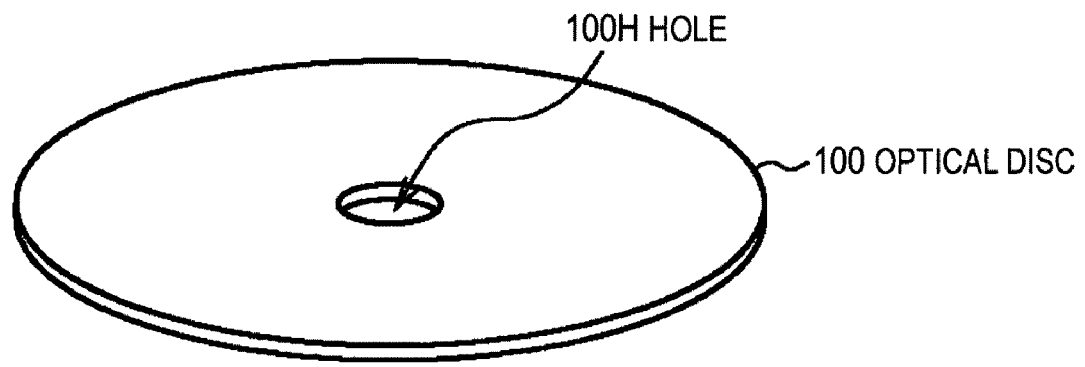
FIG. 3 is a schematic perspective view showing the appearance of an optical disc.

Actually, as shown in FIG. 3, which is an appearance diagram, the optical disc 100, as a whole, is substantially a circular plate, and is provided with a hole 100H for chucking at the center.

Figure 4:
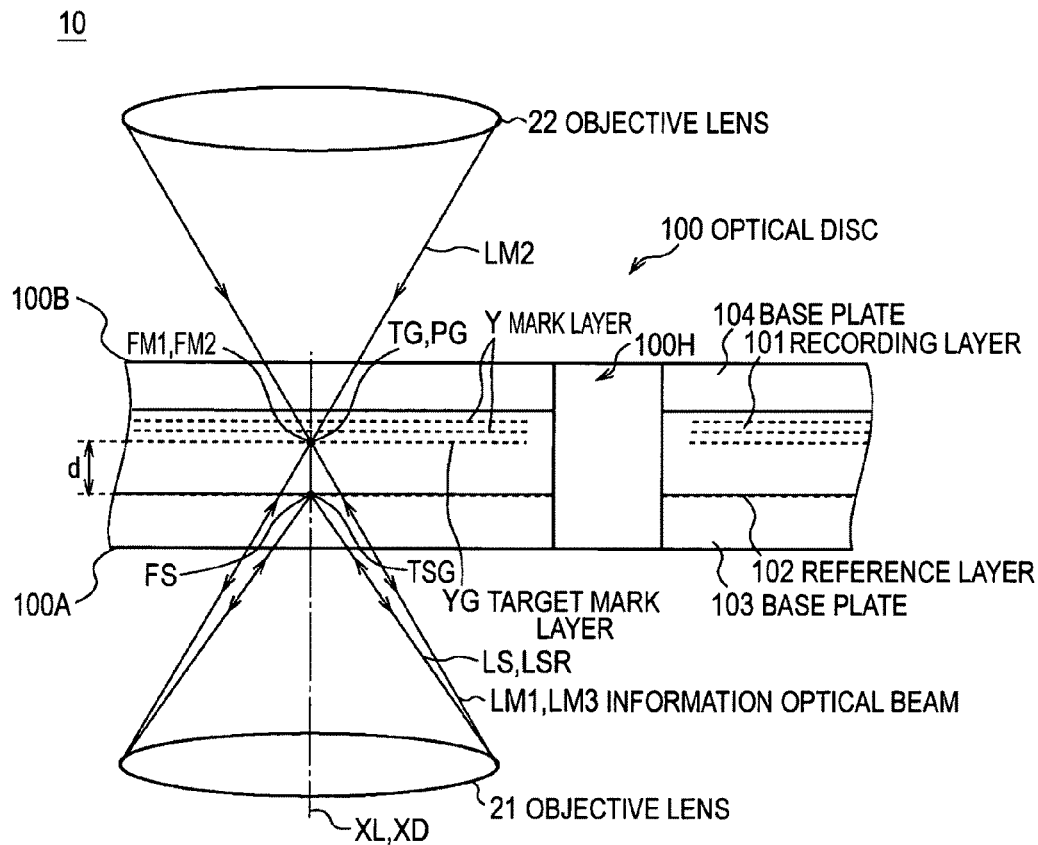
FIG. 4 is a schematic view illustrating the focusing of an optical beam according to a first embodiment.

As shown in FIG. 4, which is a sectional view, the optical disc 100 is configured such that the recording layer 101 on which information is recorded is sandwiched between base plates 103 and 104. A reference layer 102 is provided between the recording layer 101 and the base plate 103.

Incidentally, the recording layer 101 has a thickness of about 0.3 [mm], and the base plates 103 and 104 have a thickness of about 0.6 [mm].

On the reference layer 102, a guide groove is formed for servo. Specifically, a spiral track consisting of lands and grooves is formed, similarly to typical BD-R (Recordable) discs or the like. Each recording unit of the track is associated with an address which is a series of numbers. The address helps specify a track on which information is recorded or from which information is reproduced.

Instead of the guide grooves, pits or a combination of guide grooves, pit, and the like may be formed on the reference layer 102 (that is, on a boundary between the recording layer 101 and the base plate 103). The track of the reference layer 102 may be formed concentrically, not spirally.

The reference layer 102 has wavelength selectivity that the reflectance varies depending on the wavelength of the optical beam over the entire surface. For example, the reference layer 102 allows an optical beam with wavelength of about 405 [nm] to pass therethrough at high transmittance, while reflecting an optical beam with wavelength of about 660 [nm] at high reflectance.

An optical disc device 10 irradiates a reference optical beam LS with wavelength of about 660 [nm] onto an optical disc 100. In this case, the reference optical beam LS is reflected by the reference layer 102 of the optical disc 100 and becomes a reflected reference optical beam LSR.

The optical disc device 10 receives the reflected reference optical beam LSR, and performs position control on the basis of the beam reception result such that the objective lens 21 moves close to or away from the optical disc 100 in a focus direction, thereby putting a focal point FS of the reference optical beam LS on a target reference track TSG of the reference layer 102.

The recording layer 101 is made of photopolymer or the like whose refractive index changes depending on the intensity of the irradiated beam. The recording layer 101 reacts with a blue optical beam with wavelength of 405 [nm].

When recording information on the optical disc 100, the optical disc device 10 focuses an information optical beam LM1 from a first surface 100A by an objective lens 21. At the same time, the optical disc device 10 focuses an information optical beam LM2 from a second surface 100B by an objective lens 22 on the same focal point FM as the information optical beam LM1. The information optical beams LM1 and LM2 are laser beams emitted from the same beam source, causing excessive interference.

At this time, the optical disc device 10 aligns an optical axis of the reference optical beam LS and an optical axis of the information optical beam LM1. Therefore, the optical disc device 10 places a focal point FM1 of the information optical beam LM1 at a position corresponding to the target reference track TSG inside the recording layer 101, that is, on a normal line XD which passes through the target reference track TSG and is perpendicular to the reference layer 102. Hereinafter, a track which is on the target mark layer YG and corresponds to the target reference track TSG is referred to as target track TG, and the position of the focal point FM1 is referred to as target position PG.

The recording layer 101 is configured such that standing waves occur where the two information optical beams LM1 and LM2 having relatively high intensity interfere with each other inside the recording layer 101, thereby creating an interference pattern having the hologram characteristics.

As a result, a hologram, or a recording mark RM, is formed at the focal point FM1 inside the recording layer 101 of the optical disc 100.

Incidentally, the optical disc device 10 encodes information to be recorded into binary recording data which is a combination of symbols "0" and "1". The optical disc device 10 controls the emission of the information optical beam LM such that the recording mark RM is formed for the symbol "1" of recording data, while the recording mark RM is not formed for the symbol "0".

The optical disc device 10 rotates the optical disc 100 and moves the objective lenses 21 and 22 in the radial direction, while adjusting the intensity of the information optical beams LM1 and LM2.

As a result, inside the recording layer 101 of the optical disc 100, a spiral track having a plurality of recording marks RM is sequentially formed so as to correspond to a track formed on the reference layer 102.

The recording marks RM formed as described above are arranged on a plane substantially parallel to each surface, such as the first surface 100A of the optical disc 100 or the reference layer 102, thereby forming a layer (hereinafter, referred to as mark layer Y) having the recording marks RM.

The optical disc device 10 changes the position of the focal point FM1 of the information optical beam LM1 in the thickness direction of the optical disc 100, thereby forming a plurality of mark layers Y inside the recording layer 101. For example, the optical disc device 10 sequentially forms the mark layers Y from one surface 100A of the optical disc 100 with a predetermined space between adjacent layers.

When reproducing information from the optical disc 100, for example, the optical disc device 10 focuses the information optical beam LM1 from the first surface 100A. When a hologram, or the recording mark RM, is formed at the position of the focal point FM1 (that is, the target position PG), an information optical beam LM3 is emitted from the recording mark RM.

The information optical beam LM3 is the diffracted information optical beam LM1 caused by the characteristics of the hologram of the recording mark RM, and substantially has the same optical characteristics as the information optical beam LM2, which passes through the recording mark RM and travels ahead.

The optical disc device 10 generates a detection signal according to the detection result of the information optical beam LM3, and detects whether the recording mark RM is formed or not on the basis of the detection signal.

At this time, the optical disc device 10 allocates the symbol "1" if the recording mark RM is formed, and allocates the symbol "0" if no recording mark RM is formed, thereby reproducing recorded information.

As described above, in the first embodiment, when reproducing information from the optical disc 100, the optical disc device 10 irradiates the information optical beam LM1 onto the target position PG while simultaneously using the reference optical beam LS, thereby reproducing desired information.

(1-2) Configuration of Optical Disc Device

Figure 5:
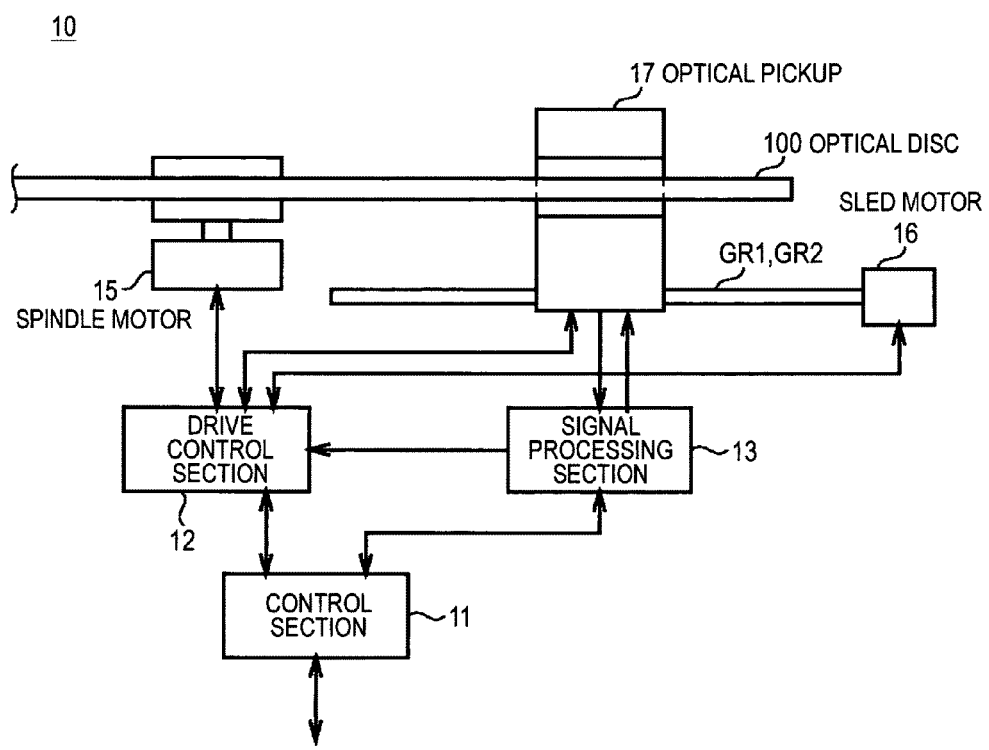
FIG. 5 is a schematic view showing the configuration of an optical disc device according to the first embodiment.

As shown in FIG. 5, the optical disc device 10 has a control section 11 as a main component. The control section 11 has a CPU (Central Processing Unit) (not shown), a ROM (Read Only Memory) storing various programs and the like, and a RAM (Random Access Memory) serving as a work memory for the CPU.

When reproducing information from the optical disc 100, the control section 11 controls a drive control section 12 to drive a spindle motor 15, thereby rotating the optical disc 100 placed on a predetermined turntable at a desired speed.

The control section 11 controls the drive control section 12 to drive a sled motor 16, thereby significantly moving an optical pickup 17 along motion shafts GR1 and GR2 in a tracking direction, that is, toward the innermost or outermost part of the optical disc 100.

The optical pickup 17 is equipped with a plurality of optical components including the objective lens 21 and the like. Under the control of the control section 11, the optical pickup 17 irradiates the reference optical beam LS and the information optical beam LM1 onto the optical disc 100, and detects the reflected reference optical beam LSR and the information optical beam LM3.

The optical pickup 17 generates a plurality of detection signals based on the detection result of the reflected reference optical beam LSR and the information optical beam LM3, and supplies the detection signals to a signal processing section 13. The signal processing section 13 performs a predetermined arithmetic process using the supplied detection signals to generate a focus error signal and a tracking error signal, and supplies the focus error signal and the tracking error signal to the drive control section 12.

The drive control section 12 has a CPU, a ROM, a RAM, and the like (not shown), similarly to the control section 11. The drive control section 12 generates a drive signal for driving the objective lens 21 on the basis of the supplied focus error signal and tracking error signal, and supplies the drive signal to a two-axis actuator 23 of the optical pickup 17.

The two-axis actuator 23 of the optical pickup 17 performs focus control and tracking control of the objective lens 21 on the basis of the drive signal to adjust the positions of the focal point FS and FM1 of the reference optical beam LS and the information optical beam LM1, respectively, focused by the objective lens 21 (described below in detail).

The signal processing section 13 performs a predetermined arithmetic process, a modulation process, a decoding process, and the like for the detection signals. In this manner, the signal processing section 13 reproduces information from the recording marks RM on the target track TG of the target mark layer YG.

(1-3) Configuration of Optical Pickup

Figure 6:
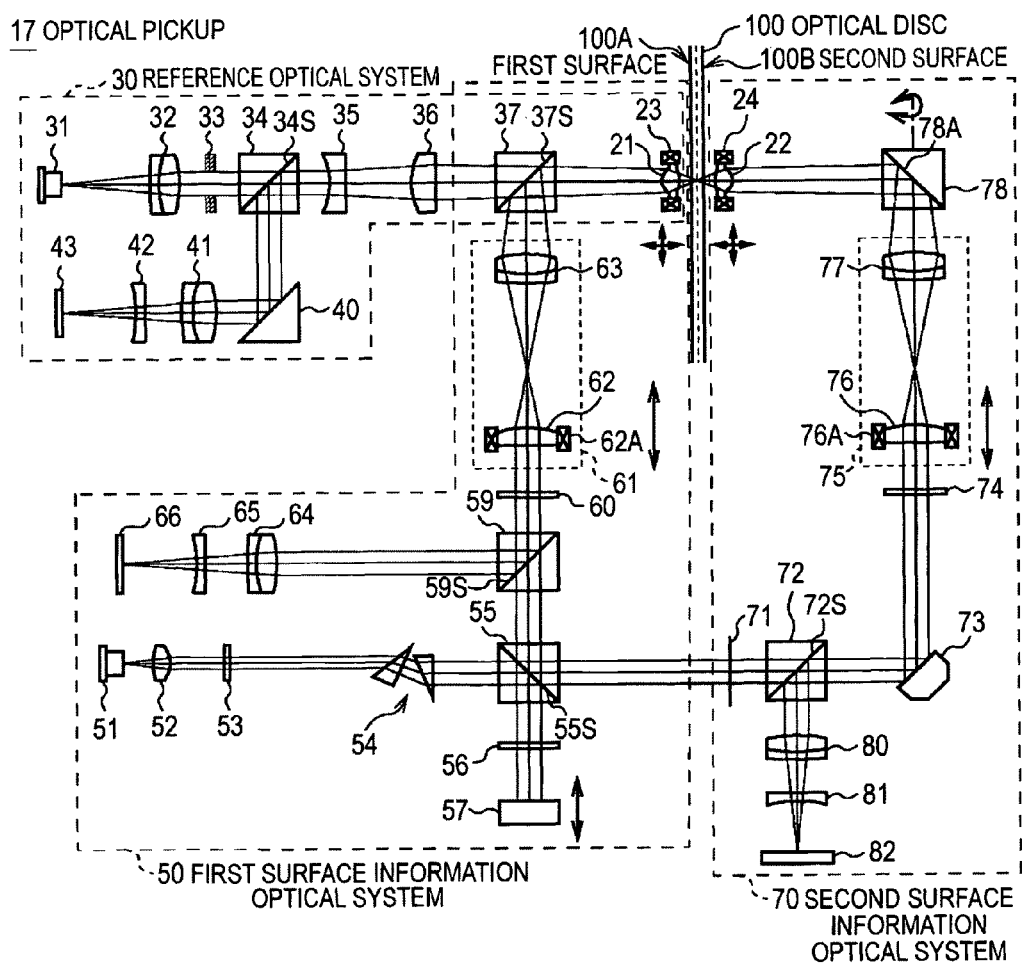
FIG. 6 is a schematic view showing the configuration of an optical pickup according to the first embodiment.

Next, the configuration of the optical pickup 17 will be described. As shown in FIG. 6, the optical pickup 17 is a combination of multiple optical components, and generally includes a reference optical system 30 for servo control of the objective lens 21, and a first surface information optical system 50 and a second surface information optical system 70 for reproduction or recording of information.

(1-3-1) Configuration of Reference Optical System

The reference optical system 30 irradiates the reference optical beam LS onto the first surface 100A of the optical disc 100, and receives the reflected reference optical beam LSR which is the reference optical beam LS reflected by the optical disc 100.

Figure 7:
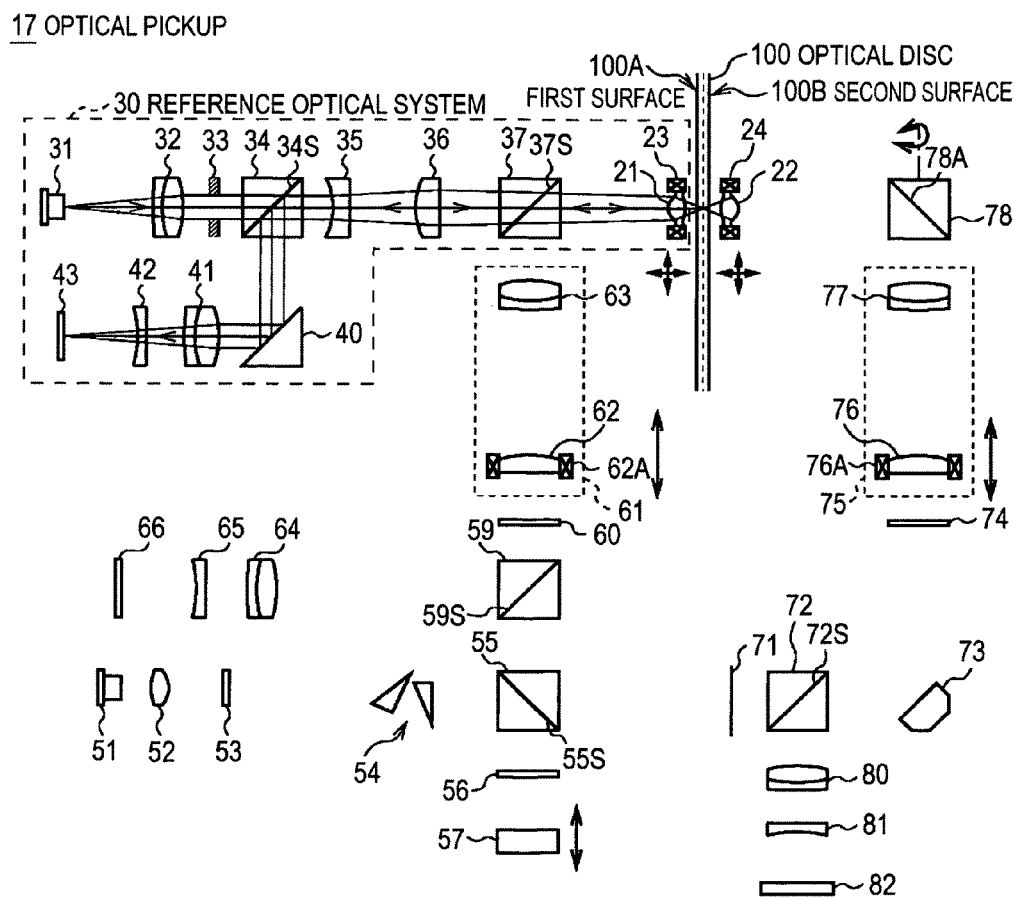
FIG. 7 is a schematic view showing an optical path of an optical beam according to the first embodiment.

In FIG. 7, a laser diode 31 of the reference optical system 30 emits a red laser beam with wavelength of about 660 [nm]. Actually, under the control of the control section 11 (FIG. 5), the laser diode 31 emits a diverging beam, or the reference optical beam LS, into a collimator lens 32. The collimator lens 32 converts the diverging reference optical beam LS into a parallel beam, and lets the parallel reference optical beam enter a non-polarization beam splitter 34 through a slit 33.

The non-polarization beam splitter 34 allows about 50% of the reference optical beam LS to pass through a reflection and transmission plane 34S and lets the reference optical beam LS enter a correction lens 35. The correction lens 35 causes the reference optical beam LS to diverge and causes the reference optical beam LS to converge to adjust the beam diameter of the reference optical beam LS in cooperation with a correction lens 36, and lets the reference optical beam LS enter a dichroic prism 37.

A reflection and transmission plane 37S of the dichroic prism 37 has wavelength selectivity that the transmittance and reflectance varies depending on the wavelength of the optical beam. The reflection and transmission plane 37S allows substantially 100% of the red optical beam to pass therethrough, while reflecting substantially 100% of a blue optical beam. Therefore, the reflection and transmission plane 37S of the dichroic prism 37 allows the reference optical beam LS to pass therethrough and lets the reference optical beam LS enter the objective lens 21.

The objective lens 21 focuses the reference optical beam LS, and irradiates the reference optical beam LS onto the first surface 100A of the optical disc 100. At this time, as shown in FIG. 4, the reference optical beam LS passes through the base plate 103 and is reflected by the reference layer 102, becoming the reflected reference optical beam LSR which travels in the direction opposite to the reference optical beam LS.

Thereafter, the reflected reference optical beam LSR becomes a parallel beam while sequentially passing through the objective lens 21, the dichroic prism 37, and the correction lenses 36 and 35, and enters the non-polarization beam splitter 34.

The non-polarization beam splitter 34 reflects about 50% of the reflected reference optical beam LSR to irradiate the reflected reference optical beam LSR onto a mirror 40. The reflected reference optical beam LSR is reflected by the mirror 40 again and enters a condenser lens 41.

The condenser lens 41 causes the reflected reference optical beam LSR to converge. Then, a cylindrical lens 42 causes the reflected reference optical beam LSR to have astigmatism and irradiates the reflected reference optical beam LSR onto a photodetector 43.

Incidentally, in the reference optical system 30, the optical location of each optical component is adjusted such that the focusing state when the reference optical beam LS is focused by the objective lens 21 and irradiated onto the reference layer 102 of the optical disc 100 is reflected in the focusing state when the reflected reference optical beam LSR is focused by the condenser lens 41 and irradiated onto the photodetector 43.

Figure 8A:
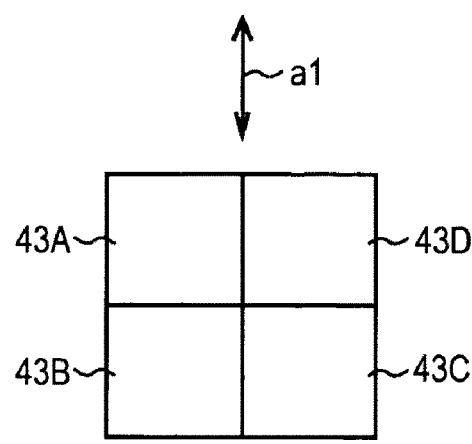
FIG. 8 is a schematic view showing the configuration of detection areas of a photodetector.

As shown in FIG. 8(A), the photodetector 43 has a surface onto which the reflected reference optical beam LSR is irradiated and which has four detection areas 43A, 43B, 43C, and 43D divided in a grid-like fashion. Incidentally, an arrow a1 indicates a direction (a vertical direction in the drawing) along which a track runs when the reference optical beam LS is irradiated onto the reference layer 102 (FIG. 4).

Each of the detection areas 43A, 43B, 43C, and 43D of the photodetector 43 detects part of the reflected reference optical beam LSR. The detection areas 43A, 43B, 43C, and 43D respectively generate detection signals U1A, U1B, U1C, and U1D (hereinafter, collectively referred to as reference detection signal U1) in accordance with the detected beam intensity, and send the detection signals U1A, U1B, U1C, and U1D to the signal processing section 13 (FIG. 5).

In this way, the reference optical system 30 irradiates the reference optical beam LS onto the reference layer 102 of the optical disc 100, detects the reflected reference optical beam LSR to generate the reference detection signal U1 (that is, the detection signals U1A, U1B, U1C, and U1D), and supplies the reference detection signal U1 to the signal processing section 13.

(1-3-2) Configuration of First Surface Information Optical System

The first surface information optical system 50 irradiates the information optical beam LM1 onto the first surface 100A of the optical disc 100, and receives the information optical beam LM3 from the optical disc 100.

Figure 9:
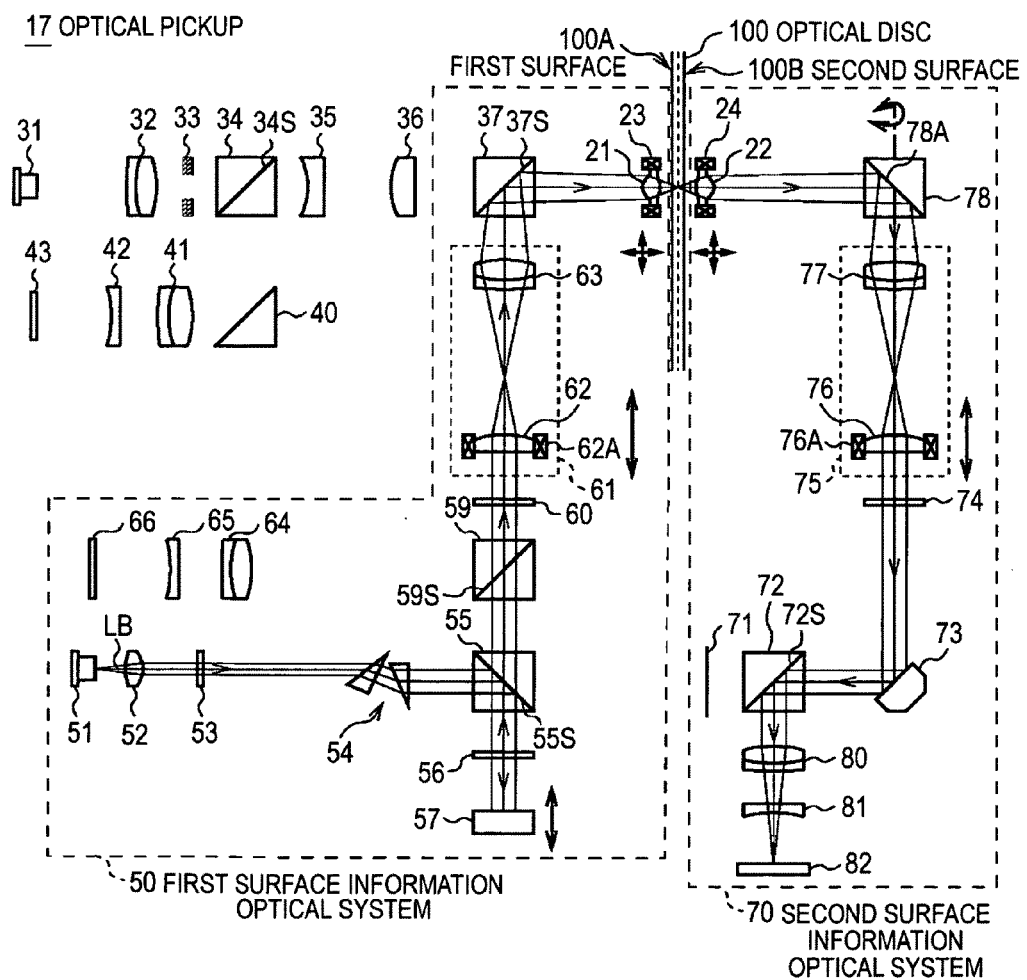
FIG. 9 is a schematic view showing an optical path of an optical beam according to the first embodiment.

In FIG. 9, a laser diode 51 of the first surface information optical system 50 emits a blue laser beam with wavelength of about 405 [nm]. Actually, the laser diode 51 emits a predetermined intensity of a diverging optical beam LM0 under the control of the control section 11 (FIG. 5), and lets the optical beam LM0 enter the collimator lens 52.

The collimator lens 52 converts the diverging optical beam LM0 into a parallel beam, and lets the parallel optical beam enter a half-wave plate 53. At this time, the polarization direction of the blue optical beam. LB is rotated at a predetermined angle by the half-wave plate 53, after the intensity distribution of the blue optical beam LB is shaped by an anamorphic prism 54, the blue optical beam LB enters a polarization beam splitter 55.

A reflection and transmission plane 55S of the polarization beam splitter 55 reflects the optical beam or allows the optical beam to pass therethrough with the ratio of reflection and transmission varying depending on the polarization direction of the optical beam. For example, the reflection and transmission plane 55S reflects about 50% of the P-polarized optical beam while allowing the remaining 50% of the P-polarized optical beam to pass therethrough, and allows about 100% of the S-polarized optical beam to pass therethrough.

Actually, the reflection and transmission plane 55S of the polarization beam splitter 55 reflects about 50% of the P-polarized optical beam LM0 and lets the P-polarized optical beam LM0 enter a quarter-wave plate 56, and allows the remaining 50% of the P-polarized optical beam LM0 to pass therethrough and lets the P-polarized optical beam LM0 enter a shutter 71. Hereinafter, the optical beam reflected by the reflection and transmission plane 55S is referred to as the information optical beam LM1, and the optical beam passing through the reflection and transmission plane 55S is referred to as the information optical beam LM2.

The quarter-wave plate 56 converts the linearly polarized information optical beam LM1 into the circularly polarized information optical beam LM1 and irradiates the circularly polarized information optical beam LM1 onto a movable mirror 57. The quarter-wave plate 56 converts the circularly polarized information optical beam LM1 reflected by the movable mirror 57 into the linearly polarized information optical beam LM1 and lets the linearly polarized information optical beam LM1 enter the polarization beam splitter 55 again.

At this time, the P-polarized information optical beam LM1 is converted into the left-handed circularly polarized information optical beam LM1 by the quarter-wave plate 56. When reflected by the movable mirror 57, the left-handed circularly polarized information optical beam LM1 is converted into the right-handed circularly polarized information optical beam LM1. Thereafter, the right-handed circularly polarized information optical beam LM1 is converted into the S-polarized information optical beam LM1 by the quarter-wave plate 56 again.

In this case, the optical pickup 17 causes the information optical beam LM1 to reciprocate between the polarization beam splitter 55 and the movable mirror 57, such that the difference in the optical path length between the information optical beam LM1 and the information optical beam LM2 is equal to or less than a coherent length. Incidentally, the position of the movable mirror 57 is controlled by the control section 11.

In accordance with the polarization direction (S-polarized) of the information optical beam LM1 from the quarter-wave plate 56, the polarization beam splitter 55 allows the information optical beam LM1 to pass through the reflection and transmission plane 55S and lets the information optical beam LM1 enter the polarization beam splitter 59.

A reflection and transmission plane 59S of a polarization beam splitter 59 reflects substantially 100% of the P-polarized optical beam, and allows substantially 100% of the S-polarized optical beam to pass therethrough. Actually, the reflection and transmission plane 59S of the polarization beam splitter 59 allows the information optical beam LM1 to pass therethrough. Then, the linearly polarized (S-polarized) information optical beam LM1 is converted into the circularly polarized (right-handed circularly polarized) information optical beam LM1 by a quarter-wave plate 60 and enters a relay lens 61.

The relay lens 61 uses a movable lens 62 to convert the parallel information optical beam LM1 into the converging information optical beam LM1. After converging, the information optical beam LM1 is converted into the diverging information optical beam LM1. The diverging information optical beam LM1 is converted into the converging information optical beam LM1 by a fixed lens 63 again, and enters a dichroic prism 37.

The movable lens 62 is driven by an actuator 62A to move in the direction of the optical axis of the information optical beam LM1 by an actuator 62A. Actually, in the relay lens 61, under the control of the drive control section 12 (FIG. 5), the actuator 62A drives the movable lens 62 so as to change the convergence state of the information optical beam LM1 emitted from the fixed lens 63.

The reflection and transmission plane 37S of the dichroic prism 37 reflects the information optical beam LM1 in accordance with the wavelength of the information optical beam LM1, and lets the information optical beam LM1 enter the objective lens 21. The objective lens 21 focuses the information optical beam LM1 and irradiates the information optical beam LM1 onto the first surface 100A of the optical disc 100.

The distance between the focal point FM1 of the information optical beam LM1 and the focal point FS of the reference optical beam LS in the focus direction is determined based on the divergence angle of the information optical beam LM1 emitted from the relay lens 61.

Actually, in the relay lens 61, the position of the movable lens 62 is adjusted such that the distance between the focal point FM1 and the focal point FS in the focus direction becomes equal to the depth d (FIG. 4) between the reference layer 102 and the target mark layer YG. Further, focus control of the objective lens 21 is performed such that the reference optical beam LS is focused on the reference layer 102 (described below in detail).

As a result, as shown in FIG. 4, the objective lens 21 focuses the information optical beam LM1 on the target mark layer YG inside the recording layer 101.

In other words, the relay lens 61 shapes the information optical beam LM1 such that the focal point FM1 of the information optical beam LM1 is focused on the target mark layer YG.

If the recording mark RM is recorded at the target position PG of the target mark layer YG of the optical disc 100, the information optical beam LM3 is generated due to the characteristics of the recording mark RM serving as a hologram and emitted to the first surface 100A.

Figure 10:
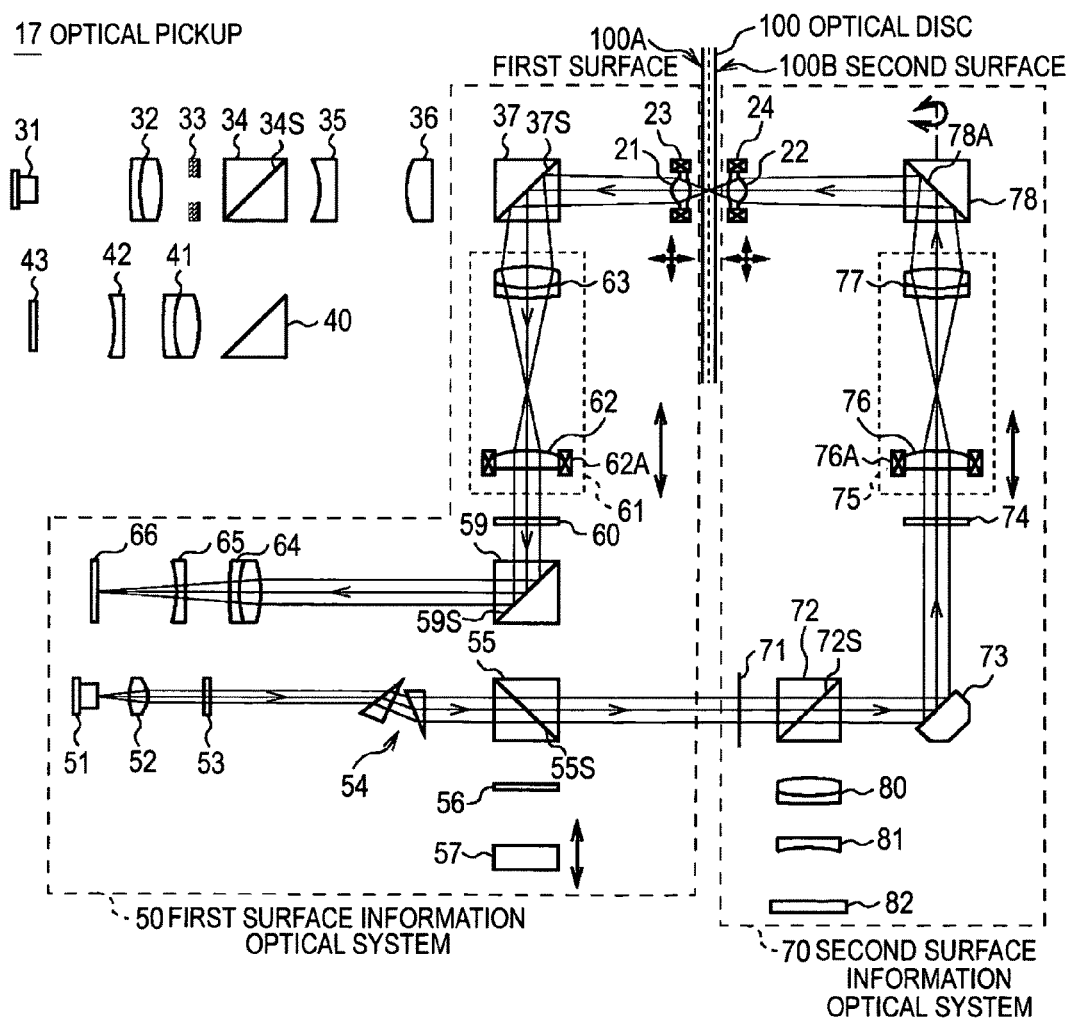
FIG. 10 is a schematic view showing an optical path of an optical beam according to the first embodiment.

As shown in FIG. 10, the information optical beam LM3 converges by the objective lens 21, is reflected by the dichroic prism 37, and enters the relay lens 61.

Subsequently, the information optical beam LM3 is converted by the fixed lens 63 and the movable lens 62 of the relay lens 61 into the parallel information optical beam LM3. Then, the circularly polarized (left-handed circularly polarized)

information optical beam LM3 is converted by the quarter-wave plate 60 into the linearly polarized (P-polarized) information optical beam LM3. The linearly polarized information optical beam LM3 enters the polarization beam splitter 59.

The polarization beam splitter 59 reflects the information optical beam LM3 in accordance with the polarization direction of the information optical beam LM3 and lets the information optical beam LM3 enter a condenser lens 64. The condenser lens 64 focuses the information optical beam LM3. Then, a cylindrical lens 65 causes the information optical beam LM3 to have astigmatism and irradiates the information optical beam LM3 onto a photodetector 66.

In the first surface information optical system 50, such as the optical position or characteristics of each component are adjusted such that the focusing state when the information optical beam LM1 is focused by the objective lens 21 and focused on the target mark layer YG of the optical disc 100 is reflected in the focusing state when the information optical beam LM3 is focused by the condenser 64 and irradiated onto the photodetector 66.

Figure 8B:
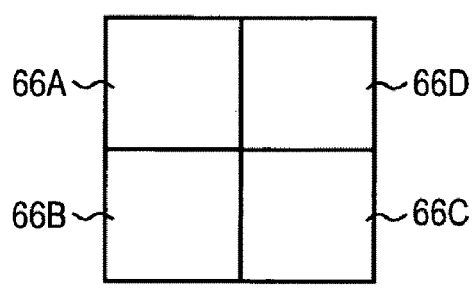

As shown in FIG. 8(B), the photodetector 66 has a surface onto which the information optical beam LM3 is irradiated and which has four detection areas 66A, 66B, 66C, and 66D divided in a grid-like fashion.

The detection areas 66A, 66B, 66C, and 66D respectively detect the intensity of part of the information optical beam LM3, generate detection signals U2A, U2B, U2C, and U2D (hereinafter, collectively referred to as information detection signal U2) in accordance with the detected beam intensity, and supply the detection signals U2A, U2B, U2C, and U2D to the signal processing section 13 (FIG. 5).

In this way, the first surface information optical system 50 irradiates the information optical beam LM1 onto the target mark layer YG of the optical disc 100, detects the information optical beam LM3 to generate the information detection signal U2 (that is, the detection signals U2A, U2B, U2C, and U2D), and supplies the information detection signal U2 to the signal processing section 13.

(1-3-3) Configuration of Second Surface Information Optical System

The second surface information optical system 70 (FIG. 10) irradiates the information optical beam LM2 onto the second surface 100B of the optical disc 100, and receives the information optical beam LM1 which is irradiated from the first surface information optical system 50 and passes through the optical disc 100.

Incidentally, the second surface information optical system 70 is used only for recording information on the optical disc 100, and is not used for reproducing information from the optical disc 100.

As described above, the polarization beam splitter 55 of the first surface information optical system 50 allows about 50% of the P-polarized optical beam LM0 to pass through the reflection and transmission plane 55S, and lets the P-polarized optical beam LM0 enter the shutter 71 as the information optical beam LM2.

The shutter 71 blocks the information optical beam LM2 or allows the information optical beam LM2 to pass therethrough under the control of the control section 11 (FIG. 5). After passing through the shutter 71, the information optical beam LM2 enters a polarization beam splitter 72.

A reflection and transmission plane 72S of the polarization beam splitter 72 allows substantially 100% of the P-polarized optical beam to pass therethrough, and reflects substantially 100% of the S-polarized optical beam. Actually, the polarization beam splitter 72 allows the P-polarized information optical beam LM2 to pass therethrough. Then, after reflected by a mirror 73, the linearly polarized (P-polarized) information optical beam LM2 is converted into the circularly polarized (left-handed circularly polarized) information optical beam LM2 by a quarter-wave plate 74, and enters a relay lens 75.

The relay lens 75 has the same configuration as the relay lens 61, and has a movable lens 76, a fixed lens 77, and an actuator 76A corresponding to the movable lens 62, the fixed lens 63, and the actuator 62A.

The relay lens 75 uses the movable lens 76 to convert the parallel information optical beam LM2 into the converging information optical beam LM2. After converging, the information optical beam LM2 is converted into the diverging information optical beam LM2. The diverging information optical beam LM2 is converted into the converging information optical beam LM2 by the fixed lens 77 again, and enters a galvanometer mirror 78.

Similarly to the relay lens 61, under the control of the drive control section 12 (FIG. 5), the relay lens 75 moves the movable lens 76 by the actuator 76A to change the convergence state of the information optical beam LM2 emitted from the fixed lens 77.

The galvanometer mirror 78 reflects the information optical beam LM2 and lets the information optical beam LM2 enter the objective lens 22. Incidentally, when the circularly polarized information optical beam LM2 is reflected, the polarization direction is reversed, for example, the left-handed circularly polarized information optical beam LM2 is converted into the right-handed circularly polarized information optical beam LM2.

The angle of a reflection plane 78A of the galvanometer mirror 78 can be adjusted by a linear motor, a piezoelectric element, or the like. Under the control of the drive control section 12 (FIG. 5), the angle of the reflection plane 78A is adjusted, thereby adjusting the travel direction of the information optical beam LM2.

The objective lens 22 is formed integrally with the two-axis actuator 24. Similarly to the objective lens 21, the objective lens 22 can be driven in the two-axis direction of the focus direction and the tracking direction by the two-axis actuator 24.

The objective lens 22 focuses the information optical beam LM2 and irradiates the information optical beam LM2 onto the second surface 100B of the optical disc 100.

At this time, as shown in FIG. 4, the information optical beam LM2 passes through the base plate 104 and is focused on the recording layer 101. The position of the focal point FM2 of the information optical beam LM2 is determined by the convergence state of the information optical beam LM2 when being emitted from the fixed lens 77 of the relay lens 75.

Meanwhile, the information optical beam LM1 focused by the objective lens 21 of the first surface information optical system 50 (FIG. 7) converges on the focal point FM1 inside the recording layer 101 of the optical disc 100, and becomes the diverging information optical beam LM1. The diverging information optical beam LM1 passes through the recording layer 101 and the base plate 104, is emitted from the second surface 100B, and enters the objective lens 22.

At this time, in the second surface information optical system 70, the information optical beam LM1 converges by the objective lens 22 to some extent, is reflected by the galvanometer mirror 78, and enters the relay lens 75. Incidentally, when the circularly polarized information optical beam LM1 is reflected by the reflection plane 78A, the polarization direction is reversed, for example, the left-handed circularly polarized information optical beam LM1 is converted into the right-handed circularly polarized information optical beam LM1.

Subsequently, the information optical beam LM1 is converted into the parallel information optical beam LM1 by the fixed lens 77 and the movable lens 76 of the relay lens 75. The circularly polarized (right-handed circularly polarized) information optical beam LM1 is converted into the linearly polarized (S-polarized) information optical beam LM1 by the quarter-wave plate 74, is reflected by the mirror 73, and enters the polarization beam splitter 72.

The polarization beam splitter 72 reflects the information optical beam LM1 in accordance with the polarization direction of the information optical beam LM1, and lets the information optical beam LM1 enter a condenser lens 80. The condenser lens 80 causes the information optical beam LM1 to converge. Then, a cylindrical lens 81 causes the information optical beam LM1 to have astigmatism and irradiates the information optical beam LM1 onto a photodetector 82.

Incidentally, in the second surface information optical system 70, the optical characteristics, position, and the like of each component are adjusted such that the distance between the focal point FM1 of the information optical beam LM1 and the focal point FM2 of the information optical beam LM2 inside the recording layer 101 is reflected in the irradiation state when the information optical beam LM1 is focused by the condenser lens 80 and is irradiated onto the photodetector 82.

Figure 8C:
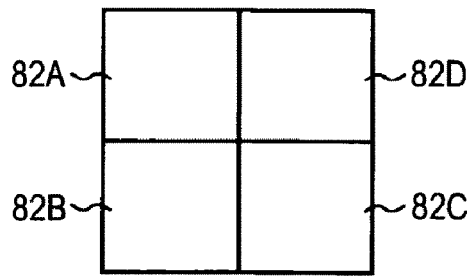

As shown in FIG. 8(C), the photodetector 82 has a surface onto which the information optical beam LM1 is irradiated and which has four detection areas 82A, 82B, 82C, and 82D divided in a grid-like fashion. Incidentally, an arrow a3 indicates a direction (a vertical direction in the drawing) along which a track runs on the reference layer 102 (FIG. 4) when the information optical beam LM1 is irradiated onto the optical disc 100.

Each of the detection areas 82A, 82B, 82C, and 82D of the photodetector 82 detects part of the information optical beam LM1. The detection areas 82A, 82B, 82C, and 82D respectively generate detection signals U3A, U3B, U3C, and U3D (hereinafter, collectively referred to as U3A to U3D) in accordance with the detected beam intensity, and send the detection signals U3A, U3B, U3C, and U3D to the signal processing section 13 (FIG. 5).

The signal processing section 13 calculates predetermined focus error signal and tracking error signal on the basis of the detection signals U3A to U3D, and sends the focus error signal and the tracking error signal to the drive control section 12.

The focus error signal and the tracking error signal represent a distance between the focal point FM1 of the information optical beam LM1 and the focal point FM2 of the information optical beam LM2 in the focus direction and the tracking direction inside the recording layer 101 of the optical disc 100.

The drive control section 12 controls the two-axis actuator 24 on the basis of the focus error signal and the tracking error signal and performs focus control and tracking control of the objective lens 22 such that the focal point FM1 of the information optical beam LM1 is aligned with the focal point FM2 of the information optical beam LM2.

The signal processing section 13 calculates a tangential error signal on the basis of the detection signals U3A to U3D and supplies the tangential error signal to the drive control section 12.

The tangential error signal represents a distance between the focal point FM1 of the information optical beam LM1 and the focal point FM2 of the information optical beam LM2 in the tangential direction (that is, the direction of a tangent to the track).

The drive control section 12 generates a tangential drive signal on the basis of the tangential error signal and supplies the tangential drive signal to the galvanometer mirror 78. Therefore, the galvanometer mirror 78 adjusts the angle of the reflection plane 78A to move the focal point FM2 of the information optical beam LM2 in the tangential direction such that the focal point FM2 of the information optical beam LM2 is aligned with the focal point FM1 of the information optical beam LM1.

As a result, the optical disc device 10 can align the focal point FM2 of the information optical beam LM2 with the focal point FM1 of the information optical beam LM1, thereby forming the recording mark RM, or a hologram, at the target position PG, as shown in FIG. 4.

(1-4) Focus Control

Next, focus control when the optical disc device 10 reproduces information from the optical disc 100 will be described. The optical disc device 10 uses the astigmatism method for focus control, focusing on the drive control section 12.

(1-4-1) Signal Generation

The signal processing section 13 calculates various signals for focus error control on the basis of the reference detection signal U1 and the information detection signal U2 supplied from the optical pickup 17.

First, the signal processing section 13 calculates a sum signal SS1 on the basis of the detection signals U1A to U1D of the reference detection signal U1 by Equation (1), and supplies the sum signal SS1 to the drive control section 12.

$$SS1 = U1A + U1B + U1C + U1D \quad (1)$$

The sum signal SS1 represents the intensity of the reflected reference optical beam LSR detected by the photodetector 43, and is the same as the so-called pull-in signal.

That is, the signal level of the sum signal SS1 is highest when the reference optical beam LS is focused on the reference layer 102, and decreases as the focal point FS of the reference optical beam LS moves away from the reference layer 102.

The signal processing section 13 calculates a focus error signal SFE2 on the basis of the detection signals U2A to U2D of the information detection signal U2 by Equation (2), and supplies the focus error signal SFE2 to the drive control section 12.

$$SFE2 = (U2A + U2C) - (U2B + U2D) \quad (2)$$

The focus error signal SFE2 represents the distance between the focal point FM1 (FIG. 4) of the information optical beam LM1 and the target mark layer YG of the optical disc 100 in the focus direction.

Incidentally, the signal processing section 13 calculates a tracking error signal STE2 on the basis of the detection signals U2A to U2D by Equation (3), and supplies the tracking error signal STE2 to the drive control section 12.

$$STE2 = (U2A + U2B) - (U2C + U2D) \quad (3)$$

The tracking error signal STE2 represents a distance between the focal point FM1 (FIG. 4) of the information optical beam LM1 and the target position PG of the target mark layer YG of the optical disc 100 in the tracking direction.

In this way, the signal processing section 13 of the optical disc device 10 calculates the sum signal SS1 based on the reference detection signal U1, and the focus error signal SFE2 and the tracking error signal STE2 based on the information detection signal U2.

(1-4-2) Pull-in Operation with Use of Sum Signal

Next, a pull-in operation when the optical disc device 10 starts to reproduce information from the optical disc 100 will be described.

(1-4-2-1) Pull-in Operation with Use of Information Detection Signal

In general, as shown in FIG. 11(A), the focus error signal curves in an S shape in accordance with the position of the objective lens in the focus direction. That is, as the objective lens 21 moves, the focus error signal SFE2 increases from the state of substantially zero level to the maximum value, is reversed and decreases to the minimum value, and converges on the zero level again, thereby appropriately curving in an S shape.

When the value of the focus error signal SFE2 becomes "0" between the maximum value and the minimum value (that is, zero cross), from the basic concept for calculation of the focus error signal SFE2, this indicates that the focal point FM1 of the information optical beam LM1 is focused on the target mark layer YG.

The focus error signal SFE2 substantially has a linear shape between the maximum value and the minimum value. In the linear interval, that is, within a range in which the focal point FM1 is located in the proximity of the target mark layer YG, the value of the focus error signal SFE2 is substantially proportional to the distance between the focal point FM1 of the information optical beam LM1 and the target mark layer YG.

In general, focus control performs feedback control using the above-described proportional relationship, so if it is out of the linear interval, so-called focus deviation occurs. The focus control cannot start outside the linear interval.

As will be apparent from FIG. 11(A), the linear interval of the focus error signal SFE2 has an extremely narrow range, as compared with the movable range of the objective lens 21.

On the basic concept, the intensity of the reflected information optical beam LMR becomes relatively large when the focal point FM1 of the information optical beam LM1 is located in the proximity of the target mark layer YG. At this time, the objective lens 21 is located within the linear interval of the focus error signal SFE2.

For this reason, in the case of typical focus control, the start of so-called focus control using the sum signal is determined by the pull-in operation for starting the focus control.

Similarly to the pull-in operation of the typical optical disc device corresponding to CD, DVD, BD, or the like, the optical disc device 10 performs a tentative pull-in operation using the information detection signal U2.

Actually, if the pull-in operation starts, the drive control section 12 repeats reciprocation in the focus direction, that is, moves the objective lens 21 close to and away from the optical disc 100 at a predetermined speed.

During the reciprocation, the signal processing section 13 calculates a sum signal SS2 on the basis of the detection signals U2A to U2D of the information detection signal U2 by Equation (4), as needed.

$$SS2=U2A+U2B+U2C+U2D \qquad (4)$$

The sum signal SS2 represents the intensity of the reflected information optical beam LMR detected by the photodetector 66.

The drive control section 12 compares the sum signal SS2 with a predetermined threshold value TH2 and generates a trigger signal ST2 as the comparison result, as needed. The trigger signal ST2 is a negative logical signal.

That is, if the sum signal SS2 is less than the threshold value TH2, the drive control section 12 sets the trigger signal ST2 at high level, and if the sum signal SS2 is equal to or more than the threshold value TH2, the drive control section 12 sets the trigger signal ST2 at low level.

Figure 11:
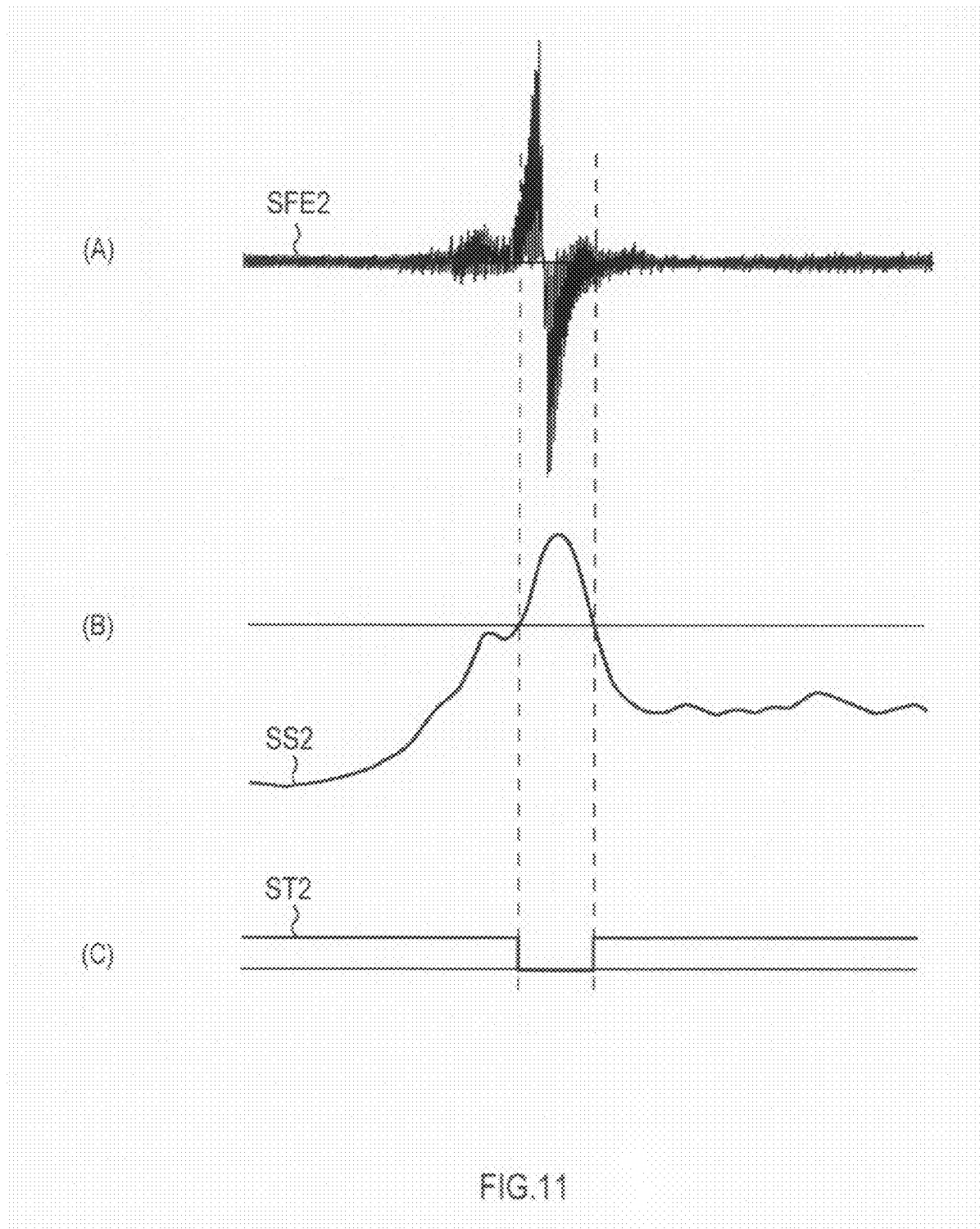
FIG. 11 shows signal waveforms at the time of a pull-in operation.

As shown in FIG. 11, if the trigger signal ST2 is at low level, the drive control section 12 determines that focus control is possible, and then starts focus control such that the focus error signal SFE2 approximates to the value "0".

Figure 12:
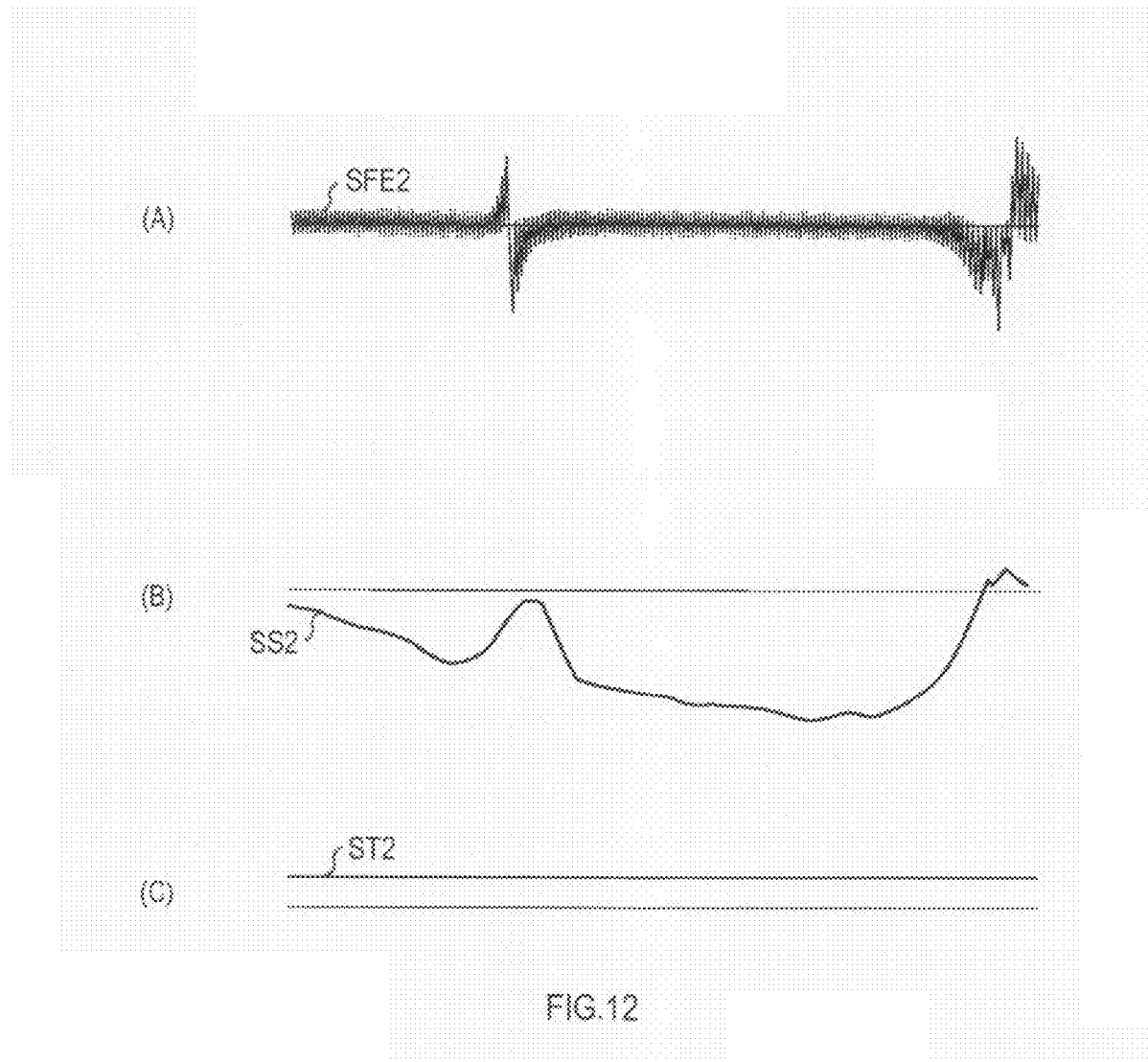
FIG. 12 shows signal waveforms at the time of a pull-in operation.

However, during the tentative pull-in operation, as shown in FIG. 12, the signal level of the actual sum signal SS2 may remain relatively low.

This is expected because, as described above, the recording marks RM are arranged in a layered structure evenly inside the recording layer 101 of the target mark layer YG of the optical disc 100.

That is, there is no land plane or reflection plane of CD, DVD, BD, or the like in the proximity of the target mark layer YG of the optical disc 100. For this reason, the intensity of the reflected information optical beam LMR may be relatively small depending on the forming pattern of the recording mark RM or the like.

At this time, the signal level of the sum signal SS2 does not exceed the threshold value TH2, and the trigger signal ST2 is maintained at high level (FIG. 12), so the drive control section 12 cannot start focus control.

As described above, it has been found that, when the same pull-in operation as in the typical optical disc device is performed using the sum signal SS2, the optical disc device 10 may not normally start focus control.

(1-4-2-2) Pull-in Operation with Use of Reference Detection Signal

Meanwhile, as described above, the reference layer 102 of the optical disc 100 is provided with guide grooves for servo, but has wavelength selectively over the entire surface. For this reason, the reference layer 102 may reflect the reference optical beam LS at relatively high reflectance.

Therefore, it can be expected that the signal level of the sum signal SS1 based on the reference detection signal U1 is constantly high, unlike the above-described sum signal SS2 (FIG. 12).

As a result, the drive control section 12 performs the pull-in operation using the sum signal SS1 based on the reference detection signal U1, instead of the sum signal SS2 based on the information detection signal U2.

Actually, the drive control section 12 first controls the relay lens 61 to ensure such that the distance between the focal point FS of the reference optical beam LS and the focal point FM1 of the information optical beam LM1 becomes close to the depth d of the target position PG.

The drive control section 12 causes the objective lens 21 to reciprocate. The drive control section 12 appropriately the motion range such that, during the reciprocation, the focal point FM1 of the information optical beam LM1 is located in the proximity of the target mark layer YG, without significantly moving away from the target mark layer YG. The motion range is sufficiently narrower than 0.3 [nm], which is the thickness of the recording layer 101.

Thereafter, the drive control section 12 compares the sum signal SS1 and a predetermined threshold value TH1, as needed, and generates the trigger signal ST1 as the comparison result. The trigger signal ST1 is a negative logical signal, similarly to the above-described trigger signal ST2.

That is, if the sum signal SS1 is less than the threshold value TH1, the drive control section 12 sets the trigger signal ST1 at high level, and if the sum signal SS1 is equal to or more than the threshold value TH1, the drive control section 12 sets the trigger signal ST1 at low level.

In the optical pickup 17, when the sum signal SS1 is equal to or more than the threshold value TH1, this indicates that the focal point FS of the reference optical beam LS is located in the proximity of the reference layer 102. Further, in the optical pickup 17, the focusing state of the information optical beam LM1 is controlled by the relay lens 61, such that the distance between the focal point FS and the focal point FM1 of the information optical beam LM1 becomes close to the depth d.

For this reason, in the optical pickup 17, when the sum signal SS1 is equal to or more than the threshold value TH1, the focal point FS of the reference optical beam LS is located in the proximity of the reference layer 102, and the focal point FM1 of the information optical beam LM1 is located in the proximity of the target mark layer YG. At this time, in the optical pickup 17, there is the recording mark RM of the target mark layer YG, such that the focus error signal SFE2 curves in an S shape.

Figure 13:
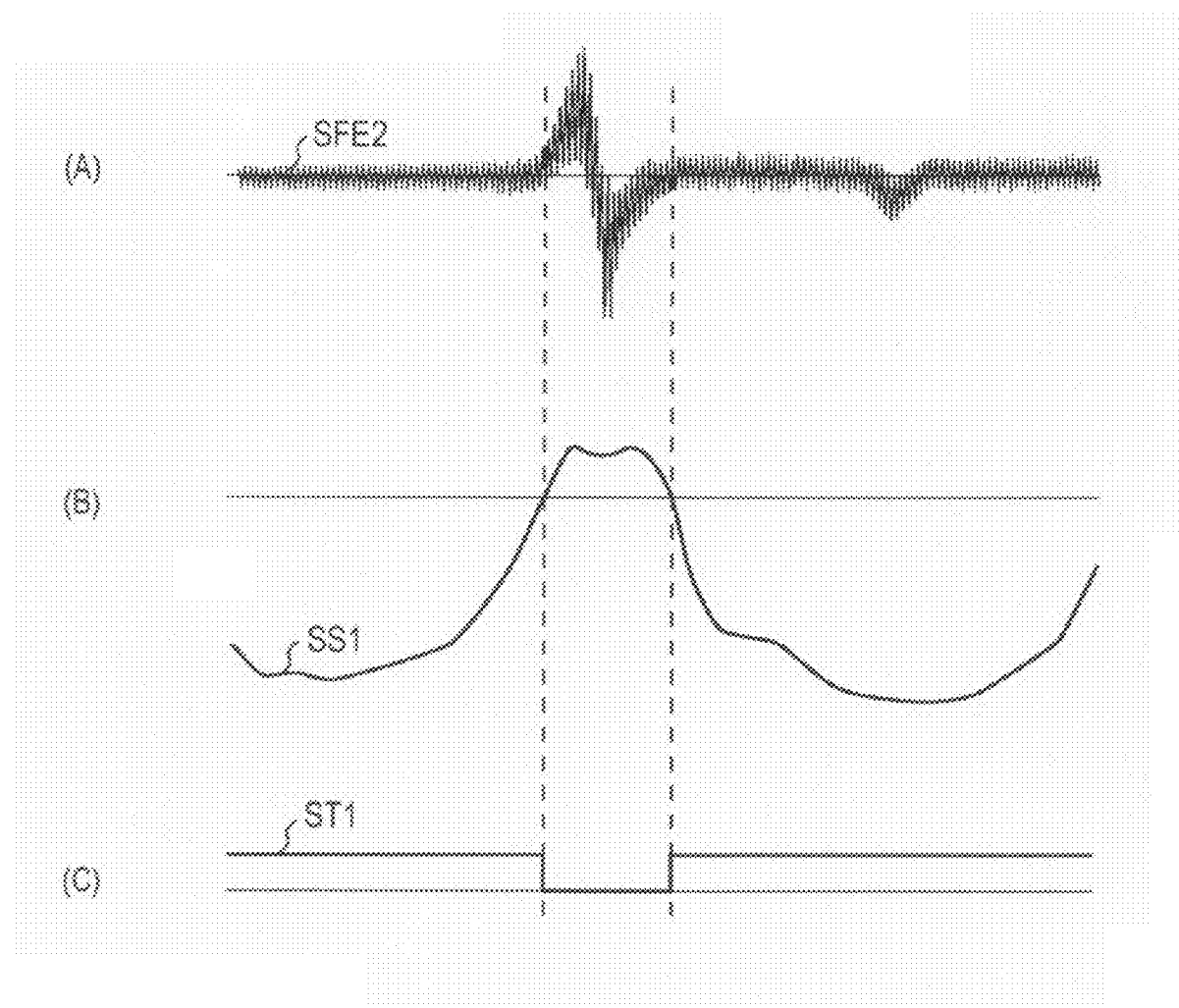
FIG. 13 shows signal waveforms at the time of a pull-in operation.

Actually, as shown in FIG. 13, when the trigger signal ST1 is at low level, the drive control section 12 determines that the pull-in operation should start and starts focus control on the basis of the focus error signal SFE2.

As shown in FIG. 13, when the focus error signal SFE2 curves in an S shape with sufficient amplitude, the drive control section 12 can end the pull-in operation if focus control can be continuously performed with no deviation.

Meanwhile, when the trigger signal ST1 is not at low level due to any reason, or when the focus error signal SFE2 does not appropriately have an S shape, the drive control section 12 cannot start focus control. Further, in the drive control section 12, the deviation of focus control that has started may occur due to any reason.

The drive control section 12 causes the objective lens 21 to repeatedly reciprocate in the focus direction, so during the reciprocation, the trigger signal ST1 is at low level and the focus error signal SFE2 has a chance to appropriately curve in an S shape. At this time, it can be expected that focus control starts and continues.

Incidentally, the drive control section 12 performs a sequence of pull-in operation in various cases, for example, not only when the optical disc 100 starts to be reproduced, but also when a new optical disc 100 is loaded or when information of the so-called read-in area is read at the time of the start of recording information on the optical disc 100.

The drive control section 12 performs tracking control by the so-called push-pull method on the basis of the tracking error signal STE2.

In this way, the optical disc device 10 uses the sum signal SS1 based on the reference detection signal U1 and the focus error signal SFE2 based on the information detection signal U2 in combination, thereby performing the pull-in operation.

(1-4-3) Pull-in Operation Process Procedure

Figure 14:
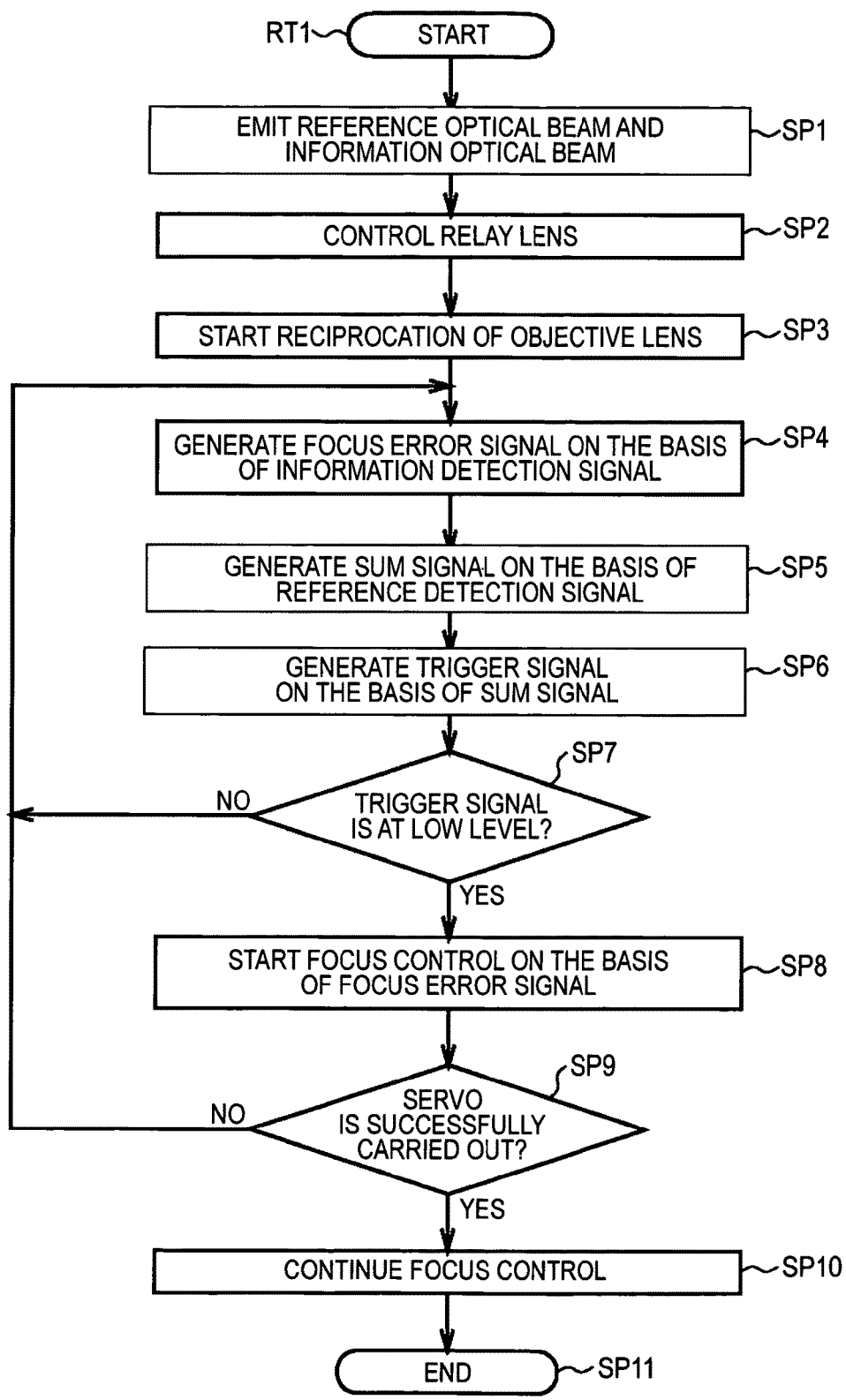
FIG. 14 is a schematic flowchart showing a pull-in operation process procedure.

Actually, the drive control section 12 performs a sequence of pull-in operation in accordance with a flowchart shown in FIG. 14.

First, when starting to reproduce the optical disc 100, the control section 11 controls the spindle motor 15 to rotate the optical disc 100, and causes the drive control section 12 to start a pull-in operation process procedure RT1.

If the pull-in operation process procedure RT1 starts, the drive control section 12 progresses to Step SP1, and the control section 11 controls the laser diodes 31 and 51 of the optical pickup 17 to emit the reference optical beam LS and the optical beam LM0 (information optical beam LM1). Then, the drive control section 12 progresses to Step SP2.

In Step SP2, the drive control section 12 controls the relay lens 61 to move the movable lens 62, thereby placing the focal point FM1 of the information optical beam LM1 close to the target mark layer YG, and progresses to Step SP3.

In Step SP3, the drive control section 12 starts the reciprocation of the objective lens 21 in the focus direction, and progresses to Step SP4.

In Step SP4, the drive control section 12 controls the signal processing section 13 to calculate the focus error signal SFE2 on the basis of the information detection signal U2 indicating the beam reception result of the information optical beam LM3, and progresses to Step SP5.

In Step SP5, the drive control section 12 controls the signal processing section 13 to calculate the sum signal SS1 on the basis of the reference detection signal U1 indicating the beam reception result of the reflected reference optical beam LSR, and progresses to Step SP6.

In Step SP6, the drive control section 12 compares the sum signal SS1 with the threshold value TH1 to generate the trigger signal ST1, and progresses to Step SP7.

In Step SP7, the drive control section 12 determines whether or not the trigger signal ST1 is at low level. If a negative result is obtained, this indicates that the sum signal SS1 is less than the threshold value TH1 and focus control should not start. At this time, the drive control section 12 returns to Step SP4 again, and repeats the above-described process until the trigger signal ST1 is at low level.

If in Step SP7, a positive result is obtained, this indicates that the sum signal SS1 is equal to or more than the threshold value TH1. At this time, the drive control section 12 progresses to Step SP8.

In Step SP8, the drive control section 12 starts focus control on the basis of the focus error signal SFE2, and progresses to Step SP9.

In Step SP9, the drive control section 12 determines whether focus control can be continuously performed with no deviation or not, that is, whether the state where focus servo is successfully carried out can be maintained or not before the trigger signal ST1 is at high level again. If a negative result is obtained, this indicates that it is necessary to try the start of focus control in an appropriate state. At this time, the drive control section 12 returns to Step SP4 again.

If in Step SP9, a positive result is obtained, the drive control section 12 progresses to Step SP10 and continues focus control. Then, the drive control section 12 progresses to Step SP11 and ends a sequence of pull-in operation process procedure RT1.

(1-5) Operation and Effect

With the above-described configuration, during the pull-in operation, the drive control section 12 of the optical disc device 10 first controls the relay lens 61 to ensure such that the distance between the focal point FS and the focal point FM1 becomes close to the depth d of the target position PG.

Subsequently, the drive control section 12 causes the objective lens 21 to reciprocate in the focus direction, and also controls the signal processing section 13 to calculate the focus error signal SFE2 on the basis of the information detection signal U2 and the sum signal SS1 on the basis of the reference detection signal U1.

The drive control section 12 compares the sum signal SS1 with the threshold value TH1 to generate the trigger signal ST1, and when the trigger signal ST1 is at low level, and starts focus control on the basis of the focus error signal SFE2.

Subsequently, the drive control section 12 of the optical disc device 10 can capture the timing at which the focus error signal SFE2 appropriately curves in an S shape with the sum signal SS1 based on the detection result of the reflected reference optical beam LSR as a trigger, thereby appropriately stating focus control.

In particular, the drive control section 12 can stably generate the sum signal SS1 and the trigger signal ST1, without affecting the forming state of the recording mark RM in the target mark layer YG since the reference layer 102 is formed over the entire surface in the optical disc 100 (FIG. 13).

For this reason, the drive control section 12 can capture the timing at which the focus error signal SFE2 appropriately curves in an S shape, thereby starting focus control, as compared with a case where the sum signal SS2 based on the beam reception result of the reflected information optical beam LMR (FIG. 12).

In other words, the drive control section 12 uses the relay lens 61 to ensure such that the distance between the focal point FS and the focal point FM1 becomes close to the depth d of the target position PG, thereby enabling focus control using the sum signal SS1, instead of the sum signal SS2.

Meanwhile, even when the focal point FM1 of the information optical beam LM1 is on the boundary between the recording layer 101 and the base plate 104, the focus error signal SFE2 may curve in an S shape. For this reason, the drive control section 12 may erroneously place the focal point FM1 on the boundary or the like depending on the condition for the pull-in operation.

The drive control section 12 determines the motion range of the objective lens 21 such that the focal point FM1 of the information optical beam LM1 is located in the proximity of the target mark layer YG. Therefore, the drive control section 12 can prevent the focal point FM1 of the information optical beam LM1 from being erroneously placed on the boundary or the like.

In the optical disc 100, the distance between the reference layer 102 and the target mark layer YG, that is, the depth d (FIG. 4) may differ from the value as designed due to the problem regarding time-dependent change or recording accuracy.

In such a case, for example, when the focus error signal is generated on the basis of the detection signal of the reflected reference optical beam LSR from the reference layer 102, and focus control is performed such that the focal point FS of the reference optical beam LS is focused on the reference layer 102, the focal point FM1 of the information optical beam LM1 deviates from the target mark layer YG.

In contrast, the drive control section 12 performs focus control by using the focus error signal SFE2 obtained from the target mark layer YG, so the focal point FM1 of the information optical beam LM1 can be focused on the target mark layer YG, regardless of the focusing state of the focal point FS of the reference optical beam LS with respect to the reference layer 102.

According to the above-described configuration, during the pull-in operation, first, the optical disc device 10 ensures that the distance between the focal point FS and the focal point FM1 becomes close to the depth d of the target position PG, and calculates the focus error signal SFE2 and the sum signal SS1 while causing the objective lens 21 to reciprocate in the focus direction. Thereafter, when the trigger signal ST1 generated on the basis of the sum signal SS1 is at low level, the drive control section 12 starts focus control on the basis of the focus error signal SFE2. Therefore, the optical disc device 10 can start focus control in an appropriate state where the focus error signal SFE2 curves in an S shape with sufficient amplitude.

Figure 15:
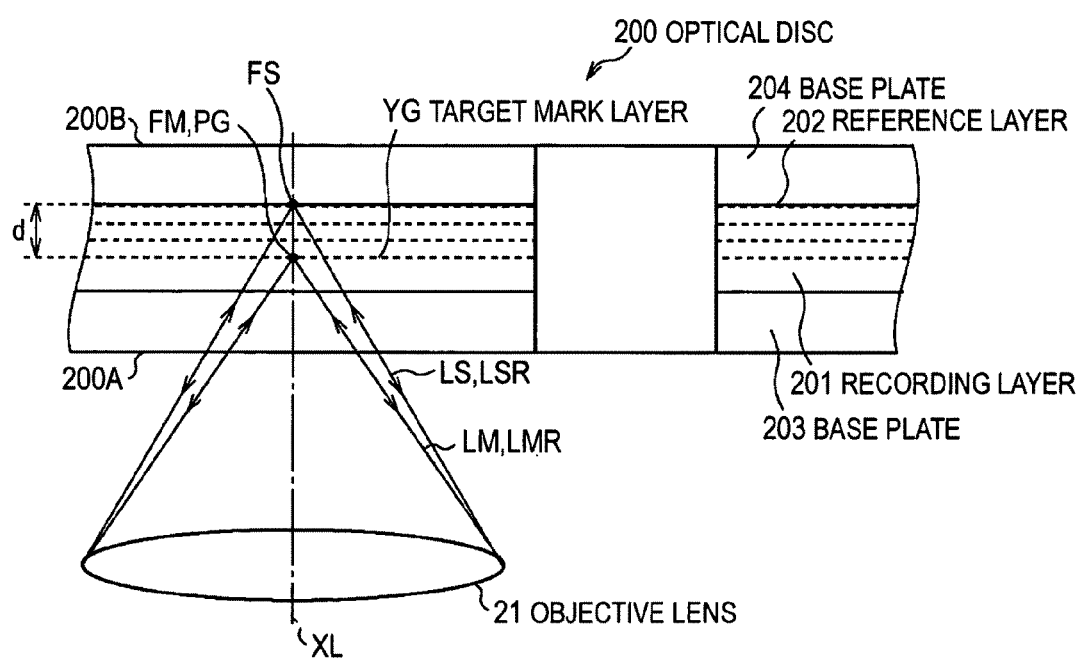
FIG. 15 is a schematic view illustrating the focusing of an optical beam according to a second embodiment.

(2) Second Embodiment (2-1) Basic Concept for Recording and Reproducing Information with respect to Optical Disc First, the basic concept for recording and reproducing information according to a second embodiment will be described. As shown in a sectional view of FIG. 15 corresponding to FIG. 4, an optical disc 200 has a recording layer 201, a reference layer 202, and base plates 203 and 204 corresponding to the recording layer 101, the reference layer 102, and the base plates 103 and 104 of the optical disc 100.

The recording layer 201 is formed by mixing a predetermined photopolymerization initiator with a resin material and hardening them. If an information optical beam LM is focused on the recording layer 201, temperature rapidly increases around the focal point FM of the information optical beam LM, thereby vaporizing the residue of the photopolymerization initiator. This forms air bubbles around the focal point.

In this case, the formed cavity serves as a recording mark RM. The recording mark RM reflects an irradiated optical beam at high reflectance since the refractive index largely differs on a boundary between the resin material for the recording layer 201 and the cavity.

The reference layer 202 is provided on a boundary between the recording layer 201 and the base plate 204, has wavelength selectivity, similarly to the reference layer 102, and is provided with guide grooves for servo. Similarly to the reference layer 102, if a reference optical beam LS is irradiated onto the reference layer 202, the reference optical beam LS is reflected toward the base plate 203 and becomes a reflected reference optical beam LSR.

An optical disc device 110 receives the reflected reference optical beam LSR, and performs position control for the objective lens 21 in the focus direction, that is, moves the objective lens 21 close to or away from the optical disc 100, on the basis of the beam reception result of the reflected reference optical beam LSR, thereby placing the focal point FS of the reference optical beam LS on the reference layer 202.

Actually, when recording information on the optical disc 200, the optical disc device 110 focuses the information optical beam LM from a first surface 200A by the objective lens 21, thereby forming a recording mark RM at the position of the focal point FM inside the recording layer 201.

Inside the recording layer 201, similarly to the first embodiment, the position of the focal point FM of the information optical beam LM varies in the thickness direction of the optical disc 200, such that a plurality of mark layers Y are formed. For example, the optical disc device 110 sequentially forms the mark layers Y from one surface 200A of the optical disc 200 with a predetermined space between adjacent layers.

When reproducing information from the optical disc 200, the optical disc device 110 focuses the information optical beam LM on the recording layer 201. The formed recording mark RM reflects the information optical beam LM as a reflected information optical beam LMR. The optical disc device 110 receives the reflected information optical beam LMR.

Incidentally, similarly to the first embodiment, the optical disc device 110 allocates the symbol "1" if the recording mark RM is formed, and allocates the symbol "0" if no recording mark RM is formed, thereby reproducing recorded information.

In this way, in the second embodiment, when reproducing information from the optical disc 200, the optical disc device 110 irradiates the information optical beam LM onto the target position PG while simultaneously using the reference optical beam LS, thereby reproducing desired information.

(2-2) Configuration of Optical Disc Device and Optical Pickup

Figure 16:
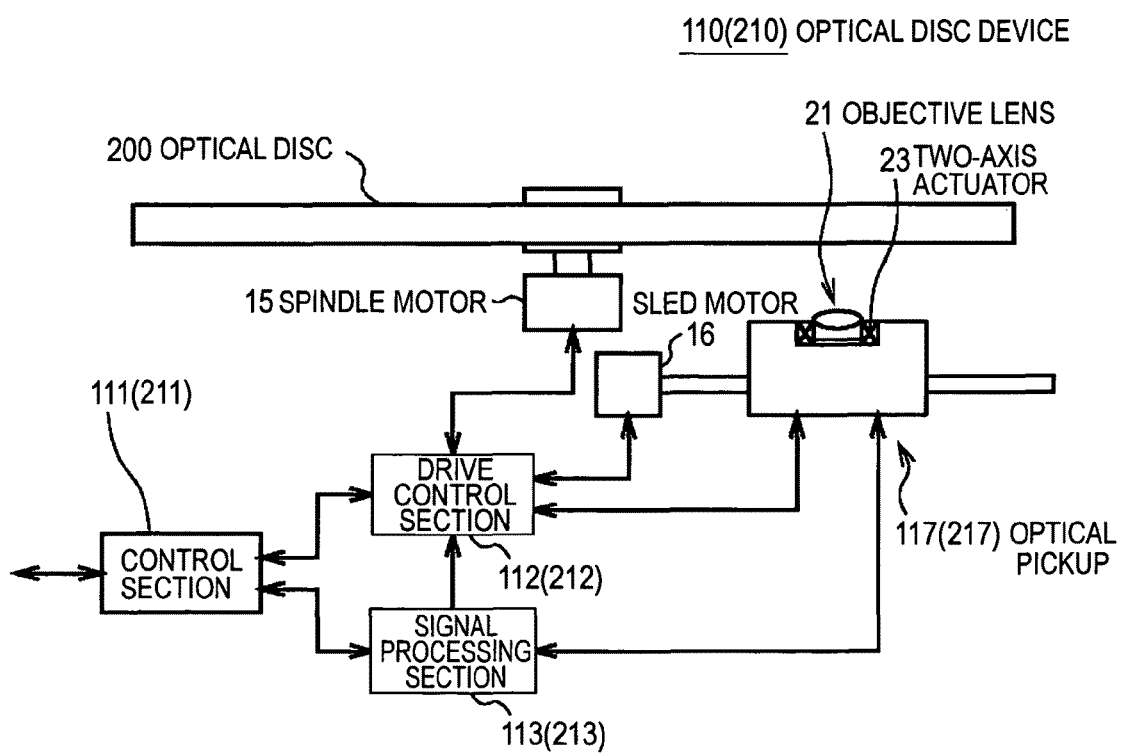
FIG. 16 is a schematic view showing the overall configuration of an optical disc device according to the second embodiment.

As shown in FIG. 16 corresponding to FIG. 5, the optical disc device 110 according to the second embodiment has a configuration similar to the optical disc device 10 according to the first embodiment. That is, the optical disc device 110 is provided a control section 111, a drive control section 112, a signal processing section 113, and an optical pickup 117, instead of the control section 11, the drive control section 12, the signal processing section 13, and the optical pickup 17. Other parts are substantially the same as those in the optical disc device 10.

Figure 17:
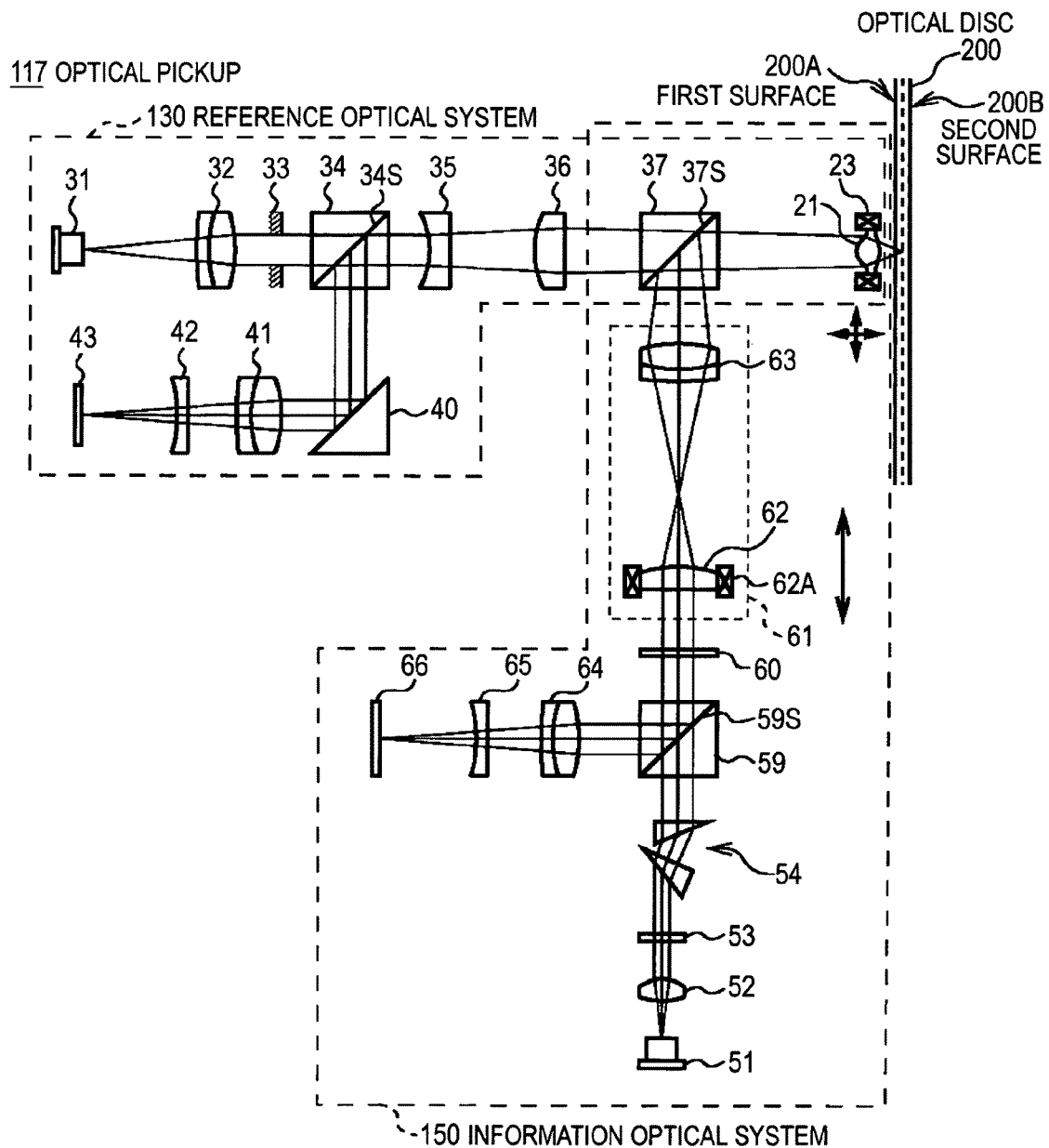
FIG. 17 is a schematic view showing the configuration of an optical pickup according to the second embodiment.

As shown in FIG. 17, the optical pickup 117 is provided with multiple optical components, but unlike the optical pickup 17 of the first embodiment, the optical pickup 117 is a so-called one-surface optical system in which various optical components are provided only on the first surface 200A of the optical disc 200.

The optical pickup 117 mainly has a reference optical system 130 corresponding to the reference optical system 30 and an information optical system 150 corresponding to the first surface information optical system 50.

The reference optical system 130 substantially has the same configuration as the reference optical system 30 of the first embodiment, and description thereof will not be repeated.

Incidentally, a photodetector 43 of the reference optical system 130 generates the same reference detection signal U1 (that is, the detection signals U1A, U1B, U1C, and U1D) as the first embodiment, and supplies the reference detection signal U1 to the signal processing section 113.

The information optical system 150 has a configuration that, with respect to the first surface information optical system 50 of the first embodiment, the polarization beam splitter 55, the quarter-wave plate 56, and the movable mirror 57 are not provided.

Accordingly, in the information optical system 150, the attachment positions of a laser diode 51, a collimator lens 52, a half-wave plate 53, and an anamorphic prism 54 are changed, such that an optical beam emitted from the anamorphic prism 54 directly enters the polarization beam splitter 59.

In the information optical system 150, an optical beam with wavelength of about 405 [nm] emitted from the laser diode 51 serves as an information optical beam LM. The information optical beam LM passes through the same path as the information optical beam LM1 in the first surface information optical system 50 of the first embodiment, is focused by the objective lens 21, and is irradiated onto the optical disc 200.

When the recording mark RM is formed on the target mark layer YG of the optical disc 200, the information optical beam LM is reflected by the recording mark RM and becomes the reflected information optical beam LMR. The reflected information optical beam LMR passes through the same path as the information optical beam LM3 in the first surface information optical system 50 and is irradiated onto a photodetector 66.

The information optical system 150 irradiates the information optical beam LM onto the target mark layer YG of the optical disc 200, detects the reflected information optical beam LMR to generate an information detection signal U2 (that is, detection signals U2A, U2B, U2C, and U2D), and supplies the information detection signal U2 to the signal processing section 113.

Incidentally, similarly to the signal processing section 13 of the first embodiment, the signal processing section 113 calculates a sum signal SS1 by Equation (1) and also calculates a focus error signal SFE2 by Equation (2).

(2-3) Pull-in Operation

In the second embodiment, similarly to the drive control section 12 of the first embodiment, the drive control section 112 performs a pull-in operation according to a pull-in operation process procedure RT1 (FIG. 14).

That is, the drive control section 112 first controls the relay lens 61 to ensure that the distance between the focal point FS and the focal point FM becomes close to the depth d of the target position PG.

Subsequently, the drive control section 112 compares the sum signal SS1 with a predetermined threshold value TH1 while causing the objective lens 21 to reciprocate in the focus direction, and generates a trigger signal ST1 as the comparison result.

If the trigger signal ST1 is at low level, the drive control section 112 determines that the pull-in operation should start, and starts focus control on the basis of the focus error signal SFE2 (FIG. 13).

As a result, similarly to the first embodiment, the drive control section 112 can stably start and continues focus control.

(2-4) Operation and Effect

With the above-described configuration, the optical disc device 110 of the second embodiment uses the drive control section 112 to ensure that the distance between the focal point FS and the focal point FM becomes close to the depth d of the target position PG.

The drive control section 112 starts focus control on the basis of the focus error signal SFE2 when the trigger signal ST1 generated on the basis of the sum signal SS1 is at low level, while causing the objective lens 21 to reciprocate in the focus direction.

Therefore, similarly to the first embodiment, the drive control section 112 of the optical disc device 110 can capture the timing at which the focus error signal SFE2 curves in an S shape with sufficient amplitude with the sum signal SS1 based on the detection result of the reflected reference optical beam LSR as a trigger, thereby appropriately starting focus control.

In addition, the drive control section 112 has the same advantages as in the first embodiment.

According to the above-described configuration, at the time of the pull-in operation, the drive control section 112 of the optical disc device 110 first ensures that the distance between the focal point FS and the focal point FM becomes close to the depth d of the target position PG, and calculates the focus error signal SFE2 and the sum signal SS1 while causing the objective lens 21 to reciprocate in the focus direction. Thereafter, when the trigger signal ST1 generated on the basis of the sum signal SS1 is at low level, drive control section 112 starts focus control on the basis of the focus error signal SFE2. Therefore, similarly to the first embodiment, the optical disc device 110 can start focus control in an appropriate state where the focus error signal SFE2 curves in an S shape with sufficient amplitude.

(3) Third Embodiment

In the third embodiment, information is reproduced from the same optical disc 200 as in the second embodiment.

In the third embodiment, however, information is reproduced from the optical disc 200 only by using the information optical beam LM, without using the reference optical beam LS.

(3-1) Configuration of Optical Disc Device and Optical Pickup

An optical disc device 210 of the third embodiment has a configuration similar to the optical disc device 110 shown in FIG. 16. That is, the optical disc device 210 is provided with a control section 211, a drive control section 212, a signal processing section 213, and an optical pickup 217, instead of the control section 111, the drive control section 112, the signal processing section 113, and the optical pickup 117. Other parts are substantially the same as those in the optical disc device 110.

Figure 18:
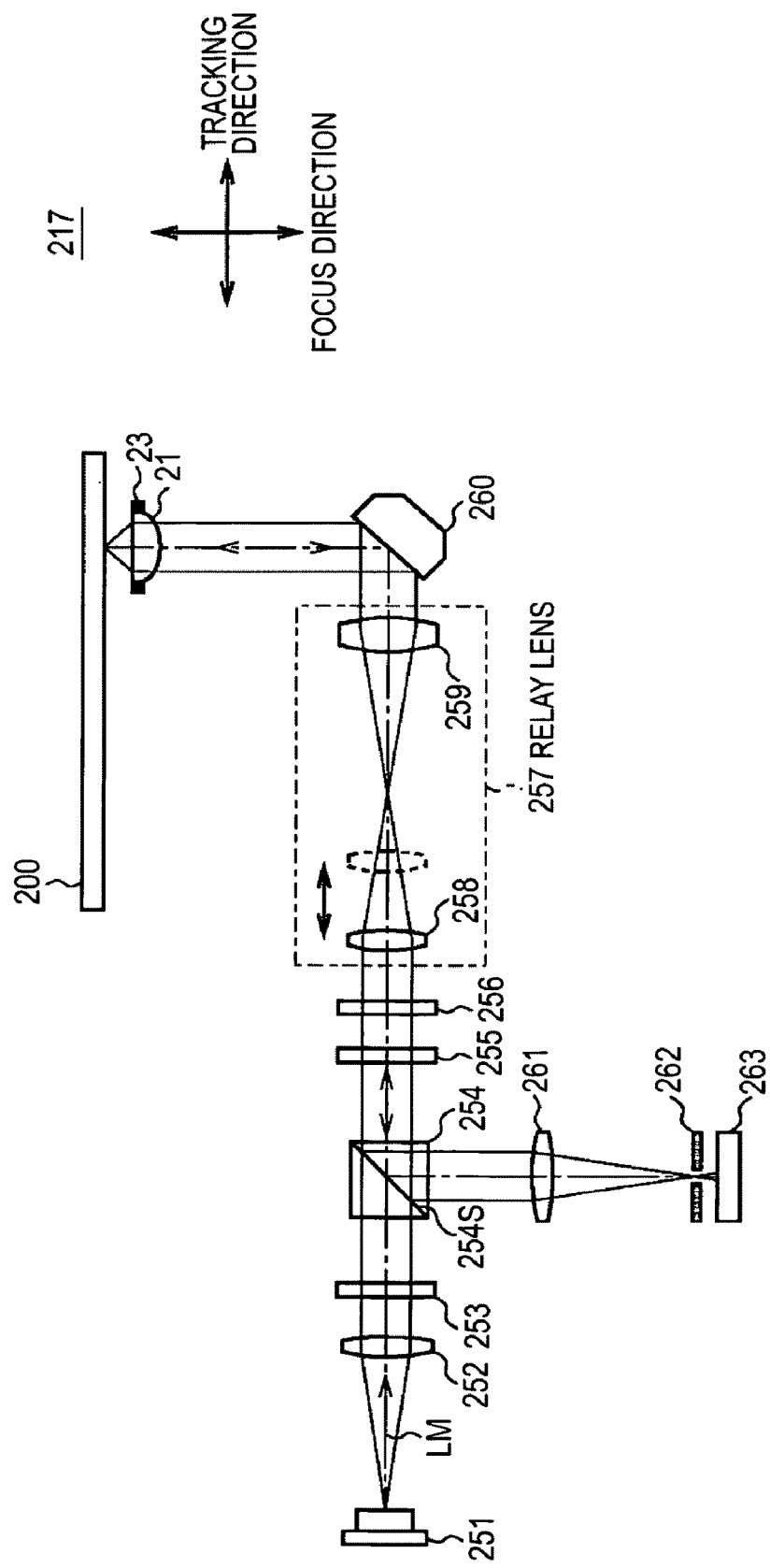
FIG. 18 is a schematic view showing an optical path of an optical beam according to a third embodiment.

As shown in FIG. 18 corresponding to FIG. 17, the optical pickup 217 is the same one-surface optical system as the optical pickup 117, in which the reference optical system 130 is not provided.

When the optical disc device 210 reproduces information from the optical disc 200, a laser diode 251 emits an information optical beam LM, which is a blue laser beam with wavelength of about 405 [nm], under the control of the control section 211 (FIG. 16), and lets the information optical beam LM enter a collimator lens 252. The collimator lens 252 converts the diverging information optical beam LM into the parallel information optical beam LM, and lets the parallel information optical beam LM enter a half-wave plate 253.

The polarization direction of the information optical beam LM is rotated at a predetermined angle by the half-wave plate 253, the information optical beam LM becomes, for example, the P-polarized information optical beam LM, and enters a polarization beam splitter 254.

The polarization beam splitter 254 has a reflection and transmission plane 254S which reflects an optical beam or allows the optical beam to pass therethrough with the ratio of reception and transmission varying depending on the polarization direction of the incoming optical beam. For example, the reflection and transmission plane 254S allows most of the P-polarized optical beam to pass therethrough and substantially reflects most of the S-polarized optical beam.

Actually, the polarization beam splitter 254 allows the P-polarized information optical beam LM to pass therethrough and lets the information optical beam LM enter a liquid crystal panel 255.

The liquid crystal panel 255 corrects spherical aberration or the like of the information optical beam LM and lets the information optical beam LM enter a quarter-wave plate 256. The quarter-wave plate 256 converts the P-polarized information optical beam LM into the right-handed circularly polarized information optical beam LM, and lets the information optical beam LM enter a relay lens 257.

The relay lens 257 uses a movable lens 258 to convert the parallel information optical beam LM into the converging information optical beam LM. After converging, the information optical beam LM is converted into the diverging information optical beam LM. The diverging information optical beam LM is converted into the converging information optical beam LM by a fixed lens 259 again, and enters a mirror 260.

The movable lens 258 is moved in the direction of the optical axis of the information optical beam LM by an actuator (not shown). Actually, the relay lens 257 uses the actuator to move the movable lens 258 under the control of the drive control section 212 (FIG. 16), thereby changing the convergence state of the information optical beam LM emitted from the fixed lens 259.

The mirror 260 reflects the information optical beam LM, reverses the polarization direction of the circularly polarized information optical beam LM, and lets the information optical beam LM enter the objective lens 21.

The objective lens 21 focuses the information optical beam LM and irradiates the information optical beam LM onto the optical disc 200. The distance between the reference layer 202 and the focal point FM of the information optical beam LM in the focus direction is determined based on the divergence angle of the information optical beam LM emitted from the relay lens 257.

Actually, the position of the movable lens 258 is controlled such that the relay lens 257 places the focal point FM close to the target mark layer YG. Focus control of the objective lens 21 is performed by the two-axis actuator 23 (described below in detail).

When the recording mark RM is recorded at the target position PG of the target mark layer YG of the optical disc 200, the information optical beam LM is reflected by the recording mark RM and becomes the reflected information optical beam LMR. The reflected information optical beam LMR is emitted to the first surface 200A.

When the circularly polarized reflected information optical beam LMR is reflected by the target mark layer YG of the optical disc 200, the rotation direction is reversed. Then, the reflected information optical beam LMR converges by the objective lens 21.

Thereafter, the reflected information optical beam LMR is reflected by the mirror 260 and is converted into the parallel reflected information optical beam LMR by the relay lens 257. Then, the reflected information optical beam LMR sequentially passes through the quarter-wave plate 256 and the liquid crystal panel 255, and enters the polarization beam splitter 254 as the S-polarized and linearly polarized information optical beam.

The reflection and transmission plane 254S of the polarization beam splitter 254 reflects the S-polarized reflected information optical beam LMR and lets the S-polarized reflected information optical beam LMR enter a condenser lens 261. The condenser lens 261 focuses the reflected information optical beam LMR and irradiates the reflected information optical beam LMR onto a photodetector 263 through a pinhole plate 262.

Figure 19:
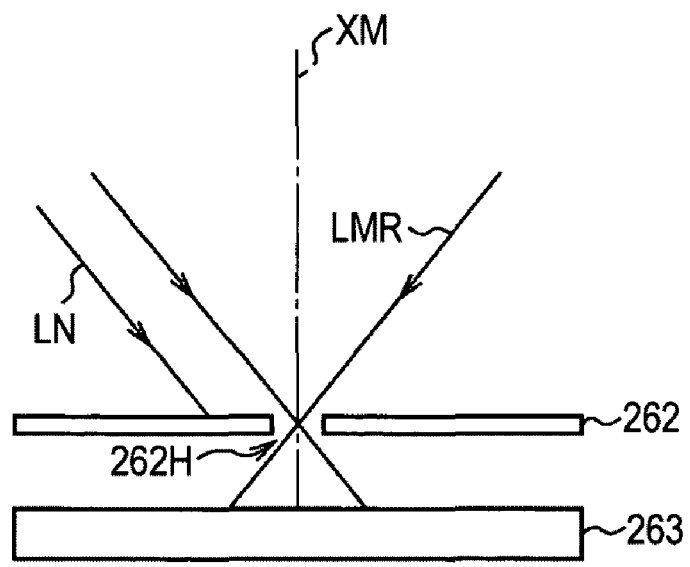
FIG. 19 is a schematic view illustrating the selection of an optical beam by a pinhole.

As shown in FIG. 19, the pinhole plate 262 is arranged such that the focal point of the reflected information optical beam LMR focused by the condenser lens 261 (FIG. 18) is located in a hole 262H, allowing the reflected information optical beam LMR to pass therethrough.

Meanwhile, if part of the information optical beam LM is reflected by the surface of the base plate 203 of the optical disc 200, the recording marks RM at positions different from the target mark position, the reference layer 202, or the like, an optical beam whose focal point is different from that of the reflected information optical beam LMR (hereinafter, referred to as stray beam LN) will emerge. For this reason, the pinhole plate 262 blocks most of the stray beam LN which has a different focal point and is not focused.

Figure 20:
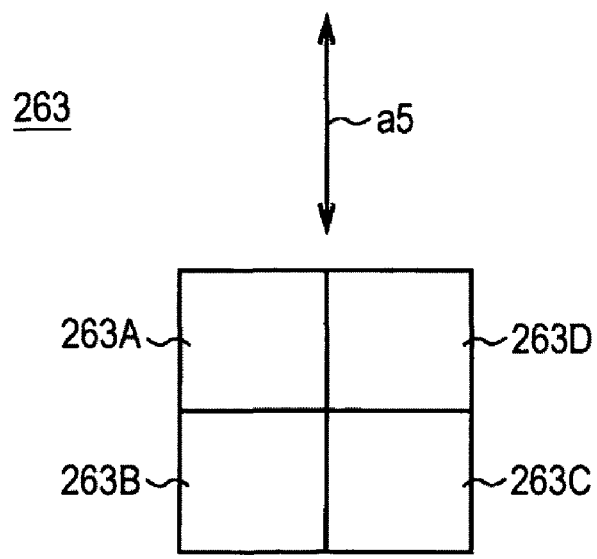
FIG. 20 is a schematic view showing the configuration of detection areas of a photodetector.

As shown in FIG. 20, the photodetector 263 has a surface onto which the reflected information optical beam LMR is irradiated and which has four detection areas 263A, 263B, 263C, and 263D divided in a grid-like fashion.

Each of the detection areas 263A, 263B, 263C, and 263D detects the intensity of part of the reflected information optical beam LMR. The detection areas 263A, 263B, 263C, and 263D respectively generate detection signals U5A, U5B, U5C, and U5D (that is, information detection signal U5) in accordance with the detected beam intensity, and supply the detection signals U5A, U5B, U5C, and U5D to the signal processing section 213 (FIG. 16).

In this way, the optical pickup 217 irradiates the information optical beam LM onto the target mark layer YG of the optical disc 200, detects the reflected information optical beam LMR to generate the information detection signal U5, and supplies the information detection signal U5 to the signal processing section 213.

(3-2) Focus Control

Next, focus control in the optical disc device 210 will be described. The optical disc device 210 uses the so-called astigmatism method for focus control.

(3-2-1) Signal Generation

The signal processing section 213 calculates various signals for focus error control on the basis of the information detection signal U5 supplied from the optical pickup 217.

First, the signal processing section 213 calculates a sum signal SS5 on the basis of the information detection signal U5 by Equation (5), and supplies the sum signal SS5 to the drive control section 212.

$$SS5=U5A+U5B+U5C+U5D \qquad (5)$$

The sum signal SS5 represents the intensity of the reflected information optical beam LMR detected by the photodetector 263, and is the same as the so-called pull-in signal.

That is, the signal level of the sum signal SS5 is highest when the information optical beam LM is focused on the target mark layer YG of the optical disc 200, and decreases as the focal point FM of the information optical beam LM moves away from the target mark layer YG.

The signal processing section 213 calculates a focus error signal SFE5 on the basis of the information detection signal U5 by Equation (6), and supplies the focus error signal SFE5 to the drive control section 212.

$$SFE5=(U5A+U5C)-(U5B+U5D) \qquad (6)$$

The focus error signal SFE5 represents the distance between the focal point FM (FIG. 15) of the information optical beam LM and the target mark layer YG of the optical disc 200 in the focus direction.

The signal processing section 213 calculates a tracking error signal STE5 on the basis of the detection signals U5A to U5D by Equation (7), and supplies the tracking error signal STE5 to the drive control section 212.

$$STE5=(U5A+U5B)-(U5C+U5D) \qquad (7)$$

The tracking error signal STE5 represents the distance between the focal point FM (FIG. 15) of the information optical beam LM1 and the target position PG of the target mark layer YG of the optical disc 200 in the tracking direction.

In this way, the optical disc device 210 uses the signal processing section 213 to calculate the sum signal SS5, the focus error signal SFE5, and the tracking error signal STE5 based on the information detection signal U5.

(3-2-2) Pull-in Operation

Next, a pull-in operation when the optical disc device 210 starts to reproduce information from the optical disc 200 will be described.

Similarly to the first and second embodiments, the drive control section 212 causes the objective lens 21 to repeatedly reciprocate in the focus direction.

During the reciprocation, the drive control section 212 detects relative change in the sum signal SS5, and generates a trigger signal ST5 in accordance with the detection result. Incidentally, similarly to the above-described trigger signals ST1 and ST2, the trigger signal ST5 is a negative logical signal indicating that focus servo should start.

Figure 21:
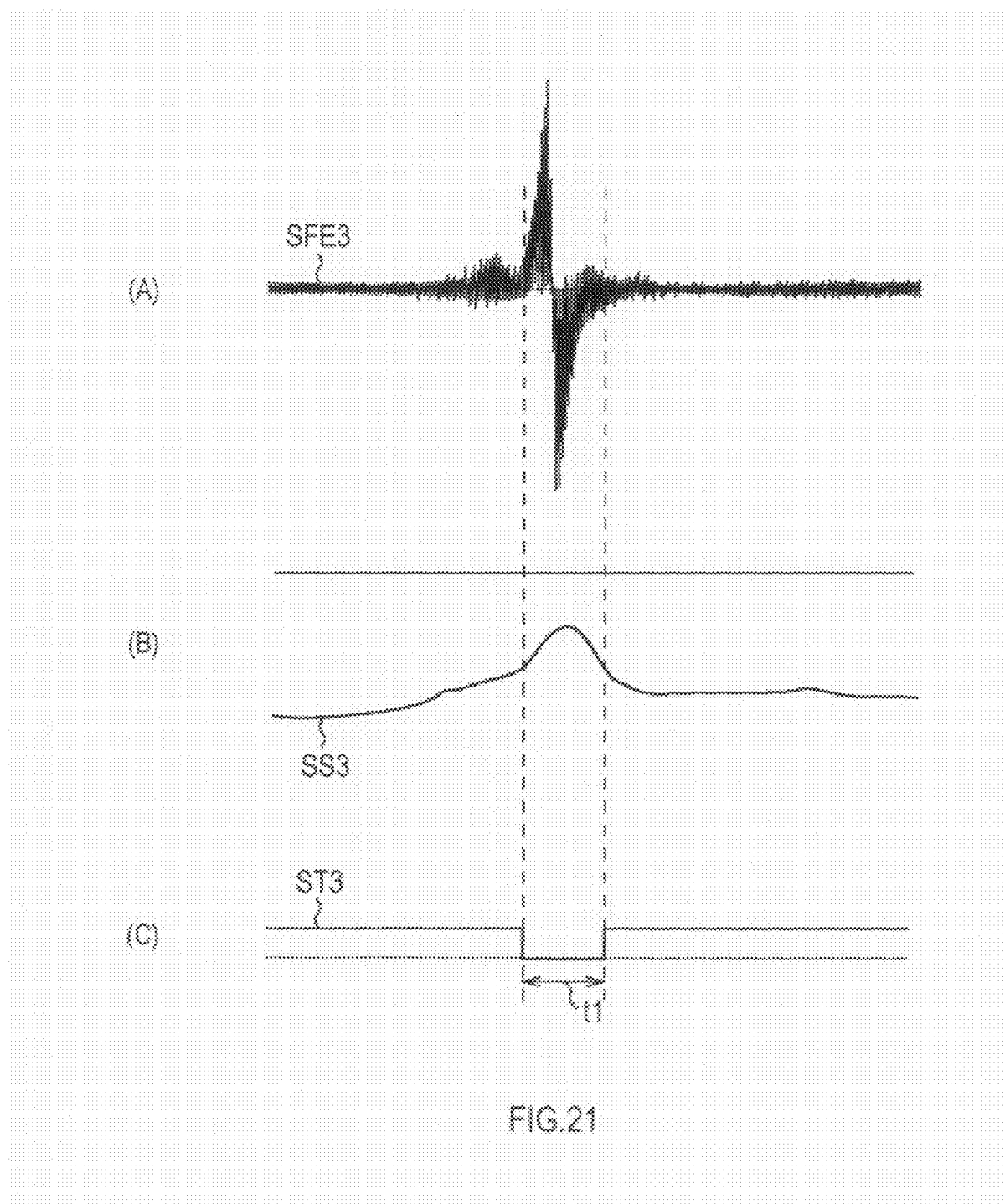
FIG. 21 shows signal waveforms at the time of a pull-in operation.

Specifically, the drive control section 212 determines, for example, whether or not the sum signal SS5 changes by a predetermined amount or more in a predetermined time. As shown in FIG. 21, if relative change in the sum signal SS5 is detected, the drive control section 212 changes the trigger signal ST5 from high level to low level for a predetermined period t1 from the timing at which the change is detected.

Incidentally, the period t1 is determined on the basis of a period in which the focus error signal SFE5 appropriately curves in an S shape.

If it is detected that the trigger signal ST5 is at low level, since the sum signal SS5 changes more than a predetermined change rate at this time, and the focal point FM is likely to be located in the proximity of the target mark layer YG, the drive control section 212 tries focus control such that the focus error signal SFE5 approximates to the value "0".

In this case, the drive control section 212 tries to perform a pull-in operation with the period t1 as a trial period, that is, tries to perform focus control and continue so-called "state where focus servo is successfully carried out".

As shown in FIG. 21, when the focus error signal SFE5 curves in an S shape with sufficient amplitude, if focus control can continue with no deviation, the drive control section 212 can correctly end the pull-in operation.

Meanwhile, even if the focal point FM of the information optical beam LM is not located in the proximity of the target mark layer YG, when the sum signal SS5 changes due to any reason, and when the focus error signal SFE5 does not appropriately curves in an S shape, for example, when the trigger signal ST5 is changed to the low level, the drive control section 212 cannot start focus control. Further, in the drive control section 212, the deviation of focus control that has started may occur due to any reason.

The drive control section 212 causes the objective lens 21 to repeatedly reciprocate in the focus direction. For this reason, in the drive control section 212, during the reciprocation, the trigger signal ST5 is at low level and the focus error signal SFE5 has a chance to appropriately curve in an S shape. At this time, it can be expected that focus control is tried and continues.

In this way, the optical disc device 210 tries focus control based on the focus error signal SFE5 at the timing determined on the basis of change in the sum signal SS5 based on the information detection signal U5, thereby performing the pull-in operation.

(3-2-3) Pull-in Operation Process Procedure

Figure 22:
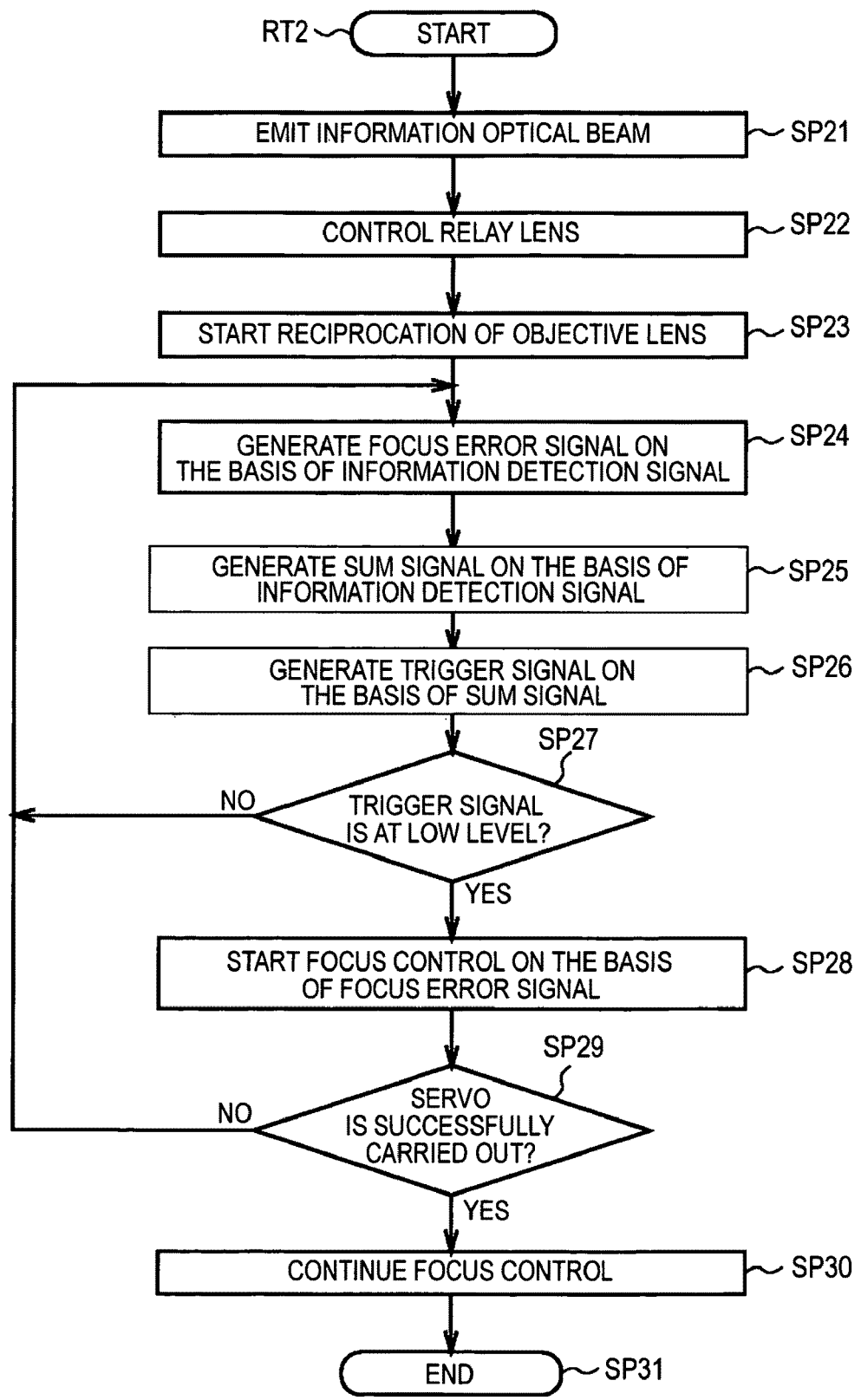
FIG. 22 is a schematic flowchart showing a pull-in operation process procedure.

Actually, the drive control section 212 performs a sequence of pull-in operation in accordance with a flowchart shown in FIG. 22 corresponding to FIG. 14.

First, when starting to reproduce the optical disc 200, the control section 211 controls the spindle motor 15 to rotate the optical disc 200 and causes the drive control section 212 to start a pull-in operation process procedure RT2.

If the pull-in operation process procedure RT2 starts, the drive control section 212 progresses to Step SP21, and the control section 211 controls the laser diode 251 of the optical pickup 217 to emit the information optical beam LM1. Then, the drive control section 212 progresses to Step SP22.

In Step SP22, the drive control section 212 controls the relay lens 257 to move the movable lens 258, thereby placing the focal point FM of the information optical beam LM close to the target mark layer YG, and progresses to Step SP23.

In Step SP23, the drive control section 212 controls the objective lens 21 to start reciprocation in the focus direction, and progresses to Step SP24.

In Step SP24, the drive control section 212 uses the signal processing section 213 to calculate the focus error signal SFE5 on the basis of the information detection signal U5, and progresses to Step SP25.

In Step SP25, the drive control section 212 uses the signal processing section 213 to calculate the sum signal SS5 on the basis of the information detection signal U5, and progresses to Step SP26.

In Step SP26, the drive control section 212 generates the trigger signal ST5 which is at low level for the period t1 when the sum signal SS5 changes at a predetermined change rate and at high level during other periods, and progresses to Step SP27.

In Step SP27, the drive control section 212 determines whether or not the trigger signal ST5 is at low level. If a negative result is obtained, this indicates that the sum signal SS5 does not almost change and focus control should start. At this time, the drive control section 212 returns to Step SP24 again, and the above-described process is repeated until the trigger signal ST5 is at low level.

If in Step SP27, a positive result is obtained, this indicates that, the sum signal SS5 changes at more than a predetermined change rate, so the focal point FM is likely to be located in the proximity of the target mark layer YG. At this time, the drive control section 212 progresses to Step SP28.

In Step SP28, the drive control section 212 starts focus control on the basis of the focus error signal SFE5, and progresses to Step SP29.

In Step SP29, the drive control section 212 determines whether the focus control can continue with no deviation or not, that is, whether the state where the focus servo is successfully carried out can be maintained or not before the trigger signal ST5 is at high level again. If a negative result is obtained, this indicates that it is necessary to tray focus control in an appropriate state. At this time, the drive control section 212 returns to Step SP24 again.

If in Step SP29, a positive result is obtained, the drive control section 212 progresses to Step SP30 and continues focus control. Then, the drive control section progresses to Step SP31, and ends a sequence of pull-in operation process procedure RT2.

(3-4) Operation and Effect

With the above-described configuration, the optical disc device 210 of the third embodiment uses the drive control section 212 to ensure that the focal point FM is placed close to the target mark layer YG.

The drive control section 212 changes the trigger signal ST5 from high level to low level for the period t1 when the sum signal SS5 changes at more than a predetermined change rate, while causing the objective lens 21 to reciprocate in the focus direction.

When the trigger signal ST5 is at low level, the drive control section 212 starts focus control on the basis of the focus error signal SFE5.

Therefore, the drive control section 212 of the optical disc device 210 can try the start of focus control with high frequency based on the trigger signal ST5 generated on the basis of change in the sum signal SS5.

At this time, the drive control section 212 generates the trigger signal ST5 on the basis of the relative change rate of the sum signal SS5, not the absolute signal level of the sum signal SS5. Therefore, even when change in the sum signal SST based on the information detection signal U5 is relatively small, the change can be detected with high accuracy (FIG. 21).

By the way, when the sum signal SS5 is changed due to various factors, the drive control section 212 changes the trigger signal ST5 to the low level. For this reason, even when the focal point FM of the information optical beam LM is away from the target mark layer YG, the drive control section 212 may start focus control, and the pull-in operation is likely to be failed, as compared with the first and second embodiments.

However, in order to prevent the user from keeping waiting, the optical disc device 210 preferably starts to reproduce the optical disc 200 in as short time as possible. From this point, the drive control section 212 increases the number of trials of the pull-in operation regardless of the number of failures, thereby reducing the time required until the pull-in operation is completed.

The drive control section 212 fixes the period t1, in which the trigger signal ST5 is at low level, to conform to the S-shaped curve of the focus error signal SFE5, regardless of change in the sum signal SS5. Therefore, the drive control section 112 can prevent the trigger signal ST5 from being changed from low level to high level in short time in response to the unstably varying sum signal SS5, and can assign sufficient time for the trial of focus control.

In the third embodiment, the pull-in operation and focus control can be performed only by using the information optical beam LM. Therefore, the configuration of the optical pickup 217 of the optical disc device 210 can be significantly simplified, as compared with the optical pickups 17 and 117 of the first and second embodiments using the reference optical beam LS.

According to the above-described configuration, at the time of the pull-in operation, the drive control section 212 of the optical disc device 210 first ensures that the focal point FM is placed close to the target mark layer YG, and calculates the focus error signal SFE5 and the sum signal SS5 while causing the objective lens 21 to reciprocate in the focus direction. Thereafter, when the sum signal SS5 changes at more than a predetermined change rate, the drive control section 212 changes the trigger signal ST5 at low level for the period t1, and starts focus control on the basis of the focus error signal SFE5 at this time. Therefore, the optical disc device 210 can perform the pull-in operation with an increased trial frequency of focus control while using only the information optical beam LM.

(4) Other Embodiments

Although in the foregoing embodiments, a case where the objective lens 21 repeatedly reciprocates at the time of the pull-in operation has been described, the invention is not limited thereto.

For example, when it is found that the pull-in operation may be completed with high accuracy while the objective lens is being moved in one direction, the objective lens 21 may be moved in one direction or may reciprocate one time. That is, the period in which the objective lens 21 is being moved may be set in various ways.

In the foregoing first and second embodiments, a case where the trigger signal ST1 is generated on the basis of the sum signal SS1, and focus control starts on the basis of the trigger signal ST1 has been described.

However, the invention is not limited thereto. For example, in the drive control sections 12 and 112, the sum signal SS1 may be compared with the threshold value TH, and focus control may start directly on the basis of the comparison result.

In the foregoing first embodiment, a case where the motion range of the objective lens 21 by the drive control section 12 is sufficiently narrower than 0.3 [mm] has been described. However, the invention is not limited thereto. The motion range may be set in various ranges, for example, may be about two times larger than the space between adjacent mark layers Y.

In this case, any range may be set insofar as the focal point FM1 of the information optical beam LM1 can be prevented from being focused on the boundary between the recording layer 101 and the base plate 104 or a different mark layer Y.

Alternatively, the motion range may be determined in various ways. For example, a range may be set in which the sum signal SS1 generated on the basis of the reflected reference optical beam LSR is equal to or more than a predetermined threshold value, or a predetermined range may be set centering on the position where the sum signal SS2 generated on the basis of the reflected information optical beam LMR is maximized. The same is also applied to the second and third embodiments.

In the foregoing third embodiment, a case where, when the sum signal SS5 changes at more than a predetermined change rate in a predetermined time, the change in the sum signal SS5 is detected has been described.

However, the invention is not limited thereto. The change in the sum signal SS5 may be detected under various conditions. For example, the change in the sum signal SS5 may be detected when the sum signal SS5 changes by a predetermined difference or more in a predetermined time range, or when the sum signal SS5 has the maximum value.

In the foregoing embodiments, a case where the astigmatism method is used to generate the focus error signal SFE2, thereby performing focus control has been described.

However, the invention is not limited thereto. For example, various methods, such as the knife-edge method, the Foucault method, and the like, may be used to generate a focus error signal, thereby performing focus control.

In the foregoing first and second embodiments, a case where the photodetector 43 is provided with the four detection areas 43A to 43D divided in a grid-like fashion, and the detection signals U1A to U1D of the detection areas 43A to 43D are added to calculate the sum signal SS1 has been described.

However, the invention is not limited thereto. The sum signal may be detected by combinations of various optical elements and detection areas. For example, a diffraction grating may be provided between the condenser lens 41 and the cylindrical lens 42, a diffracted optical beam may be detected by another detection area. The same is also applied to the third embodiment.

In the foregoing first and second embodiments, a case where the reference optical beam LS is the red optical beam with wavelength of about 660 [nm], and the information optical beams LM1, LM2, and LM are blue optical beams with wavelength of about 405 [nm] has been described.

However, the invention is not limited thereto. Optical beams with various wavelengths may be used. For example, a reference optical beam with wavelength of about 780 [nm] may be used, and an information optical beam with wavelength of about 530 [nm] may be used.

In this case, it should suffice that the reference layer 102 of the optical disc 100 and the reference layer 202 of the optical disc 200 have characteristics that reflect the reference optical beam in accordance with its wavelength, and allows the information optical beam to pass therethrough in accordance with its wavelength. The recording layers 101 and 201 is preferably made of a material which reacts with the wavelength of the information optical beam.

When the optical disc 200 is used, the reference optical beam and the information optical beam may have the same wavelength.

Although in the foregoing third embodiment, a case where the information optical beam LM is the blue optical beam with wavelength of about 405 [nm] has been described, the invention is not limited thereto. Various wavelengths may be used. In this case, the recording layer 201 is preferably made of a material which reacts with the wavelength of the information optical beam.

In the foregoing first and second embodiments, a case where the relay lens 61 is a combination of the movable lens 62 and the fixed lens 63 has been described.

However, the invention is not limited thereto. For example, other optical elements or a combination thereof may be used. What is necessary is that information optical beam LM1 is appropriately formed when incident on the objective lens 21. The same is also applied to the relay lens 75 and the relay lens 257 of the third embodiment.

In the foregoing third embodiment, the relay lens 257 may not be provided. In this case, the objective lens 21 may be moved in the focus direction such that the focal point FM of the information optical beam LM is placed on the target mark layer YG.

Although in the foregoing first embodiment, a case where the optical disc device 10 records information on the optical disc 100 and reproduces information from the optical disc 100 has been described, the invention is not limited thereto.

For example, the optical disc device 10 may an optical disc device for reproduction only which can only reproduce information from the optical disc 100. In this case, the second surface information optical system 70 may not be provided. The same is also applied to the optical disc device 110 of the second embodiment.

In the foregoing embodiments, a case has been described in which the optical disc device 10 serving as an optical disc device includes the laser diode 31 serving as a reference beam source, the laser diode 51 serving as an information beam source, the objective lens 21 serving as an objective lens, the relay lens 61 and the dichroic prism 37 serving as a beam shaping section, the drive control section 12 and the two-axis actuator 23 serving as a motion control section, the photodetector 43 serving as a reference beam receiving section, the photodetector 66 serving as an information beam receiving section, the signal processing section 13 serving as a signal generation section, and the control section 11 and the drive control section 12 serving as a servo control section. However, the invention is not limited thereto. The optical disc device may be configured in a different manner, but include the reference beam source, the information beam source, the objective lens, the beam shaping section, the motion control section, the reference beam receiving section, the information beam receiving section, the signal generation section, and the servo control section.

In the foregoing embodiments, a case has been described in which the optical disc device 210 serving as an optical disc device includes the laser diode 251 serving as a beam source, the objective lens 21 serving as an objective lens, the drive control section 212 and the two-axis actuator 23 serving as a motion control section, the photodetector 263 serving as a beam receiving section, the signal processing section 213 serving as a signal generation section, and the control section 211 and the drive control section 212 serving as a servo control section. However, the invention is not limited thereto. The optical disc device may be configured in a different manner, but include the beam source, the objective lens, the motion control section, the beam receiving section, the signal generation section, and the servo control section.

INDUSTRIAL APPLICABILITY

The invention may also be applied to an optical disc device that records information, such as video, sound, or computer data, on an optical disc, and reproduces the information from the optical disc.

EXPLANATION OF REFERENCE 10, 110, 210 . . . OPTICAL DISC DEVICE, 11, 111, 211 . . . CONTROL SECTION, 12, 112, 212 . . . DRIVE CONTROL SECTION, 13, 113, 213 . . . SIGNAL PROCESSING SECTION, 17, 117, 217 . . . OPTICAL PICKUP, 21, 22 . . . OBJECTIVE LENS, 23, 24 . . . TWO-AXIS ACTUATOR, 31, 51, 251 . . . LASER DIODE,32, 52, 252. . . COLLIMATOR LENS,37. . . DICHROIC PRISM, 55, 254 . . . POLARIZATION BEAM SPLITTER, 61, 75, 257. . . RELAY LENS, 62, 76, 258. . . MOVABLE LENS, 43, 66, 82, 263 . . . PHOTODETECTOR, 100, 200 . . . OPTICAL DISC, 101, 201 . . . RECORDING LAYER, 102, 202 . . . REFERENCE LAYER, TG . . . TARGET TRACK, Y . . . MARK LAYER, YG . . . TARGET MARK LAYER, RM . . . RECORDING MARK, LS . . . REFERENCE OPTICAL BEAM, LSR . . . REFLECTED REFERENCE OPTICAL BEAM, LM1, LM2, LM3, LM . . . INFORMATION OPTICAL BEAM, LMR . . . REFLECTED INFORMATION OPTICAL BEAM, FS, FM1, FM2, FM . . . FOCAL POINT

The invention claimed is:

1. An optical disc device comprising:
a reference beam source to emit a reference optical beam so as to irradiate a reference layer provided in an optical disc;
an information beam source to emit an information optical beam so as to reproduce information from a mark layer on which recording marks representing the information are arranged inside a recording layer provided in the optical disc at a predetermined distance from the reference layer;
an objective lens to focus the reference optical beam and the information optical beam;
a beam shaping section to shape the information optical beam entering the objective lens such that, in terms of a direction of an optical axis of the information optical beam, a distance between focal points of the reference optical beam and the information optical beam focused by the objective lens becomes equal to the predetermined distance;
a motion control section to move the objective lens in the direction of the optical axis of the information optical beam;
a reference beam receiving section to receive a reflected reference optical beam, which is the reference optical beam reflected by the reference layer of the optical disc, and generate a reference detection signal;
an information beam receiving section to receive a reflected information optical beam, which is the information optical beam reflected by the mark layer of the optical disc, and generate an information detection signal;
a signal generation section to generate a reflected reference beam intensity signal representing the intensity of the reflected reference optical beam based at least in part on the reference detection signal, and generate a focus error signal, which varies depending on a distance from the mark layer to the focal point of the detected optical beam in a proximity of the mark layer, based at least in part on a plurality of information detection signals; and
a servo control section to start focus control based on the focus error signal when a change in the reflected reference beam intensity signal satisfies a condition.

2. The optical disc device according to claim 1, wherein the servo control section starts the focus control when the reflected reference beam intensity signal exceeds a predetemined threshold value.

3. The optical disc device according to claim 2, wherein the servo control section interrupts the focus control when the reflected reference beam intensity signal falls below the predetermined threshold value and deviation of the focus control occurs after the focus control starts, and resumes the focus control when the reflected reference beam intensity signal exceeds the predetermined threshold value again.

4. The optical disc device according to claim 1, wherein the motion control section moves the objective lens within a predetermined motion range in terms of the direction of the optical axis of the information optical beam.

5. The optical disc device according to claim 4, wherein the motion control section sets a proximity range, in which the focal point of the optical beam is located in the proximity of the mark layer, as the predetermined motion range.

6. The optical disc device according to claim 5, wherein the motion control section determines the proximity range with a position where the reflected reference beam intensity signal is maximized as a center of motion of the objective lens.

7. The optical disc device according to claim 5, wherein the motion control section determines the proximity range with a position where the reflected information beam intensity signal representing the intensity of the reflected information optical beam is maximized as a center of motion of the objective lens.

8. The optical disc device according to claim 5, wherein the motion control section sets as the proximity range a range in which the reflected reference beam intensity signal becomes equal to or larger than a first predetermined threshold value.

9. The optical disc device according to claim 5, wherein the motion control section sets as the proximity range a range in which a reflected information beam intensity signal representing the intensity of the reflected information optical beam becomes equal to or larger than a second predetermined threshold value.

10. A focus control method comprising:
a reference beam emission step of emitting a reference optical beam so as to irradiate a reference layer provided in an optical disc;
an information beam emission step of emitting an information optical beam so as to reproduce information from a mark layer on which recording marks representing the information are arranged inside a recording layer provided in the optical disc at a predetermined distance from the reference layer;
a beam shaping step of shaping the information optical beam entering an objective lens such that, in terms of a direction of an optical axis of the information optical beam, a distance between focal points of the reference optical beam and the information optical beam focused by the objective lens becomes equal to the predetermined distance;
a motion control step of moving the objective lens in the direction of the optical axis of the information optical beam;

a reference beam receiving step of receiving a reflected reference optical beam which is the reference optical beam reflected by the reference layer of the optical disc and generating a reference detection signal;

an information beam receiving step of receiving a reflected information optical beam which is the information optical beam reflected by the mark layer of the optical disc and generating an information detection signal;

a signal generation step of generating a reflected reference beam intensity signal representing the intensity of the reflected reference optical beam based at least in part on the reference detection signal and generating a focus error signal, which varies depending on a distance from the mark layer to the focal point of the detected optical beam in the proximity of the mark layer, based at least in part on a plurality of information detection signals; and a servo control step of starting focus control based on the focus error signal when a change in the reflected reference beam intensity signal satisfies a condition.

11. An optical disc device comprising:

a beam source to emit an optical beam to an optical disc on which a recording mark layer having recording marks representing information arranged planarly is formed inside a recording layer;

an objective lens to focus the optical beam;

a motion control section to move the objective lens in a direction of an optical axis of the optical beam within a proximity range in which a focal point of the optical beam focused by the objective lens is located in the proximity of the recording mark layer;

a beam receiving section to receive a reflected mark optical beam which is the optical beam focused by the objective lens and reflected by the recording mark layer, and generate a beam reception signal;

a signal generation section to generate a focus error signal, which varies depending on a distance from the mark layer to the focal point of the optical beam in the proximity of the mark layer, based at least in part on the beam reception signal;

a servo control section to start focus control based on the focus error signal within the proximity range;

wherein the signal generation section generates a beam intensity signal representing the intensity of the optical beam, in addition to the focus error signal, and the servo control section starts the focus control based on focus error signal when a change in the beam intensity signal satisfies a condition.

12. The optical disc device according to claim 11, wherein a detection section sets a time when the amount of change in the beam intensity signal exceeds a predetermined threshold value within a predetermined time as the condition.

13. The optical disc device according to claim 11, wherein the servo control section tries the focus control over a predetermined trial period after change in the beam intensity signal.

14. The optical disc device according to claim 13, wherein the trial period is equal to a period in which the focus error signal has a maximum value and a minimum value.

* * * * *